United States Patent
Springer et al.

(10) Patent No.: US 10,704,505 B2
(45) Date of Patent: Jul. 7, 2020

(54) METHODS AND SYSTEMS FOR A BLOW-OFF LINE

(71) Applicant: Ford Global Technologies, LLC, Dearborn, MI (US)

(72) Inventors: Moritz Klaus Springer, Hagen (DE); Helmut Hans Ruhland, Eschweiler (DE); Jan Mehring, Cologne (DE); Thomas Lorenz, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 124 days.

(21) Appl. No.: 15/984,196

(22) Filed: May 18, 2018

(65) Prior Publication Data

US 2018/0355824 A1 Dec. 13, 2018

(30) Foreign Application Priority Data

Jun. 9, 2017 (DE) .................. 10 2017 209 741

(51) Int. Cl.
*F02M 26/06* (2016.01)
*F02M 26/22* (2016.01)
(Continued)

(52) U.S. Cl.
CPC .......... *F02M 26/06* (2016.02); *F01N 3/0835* (2013.01); *F01N 3/0871* (2013.01); *F01N 3/101* (2013.01);
(Continued)

(58) Field of Classification Search
CPC ...... F02M 26/06; F02M 26/22; F01N 3/0835; F01N 3/0871; F01N 3/101; F01N 3/30;
(Continued)

(56) References Cited

U.S. PATENT DOCUMENTS 5,417,068 A * 5/1995 Olofsson ................. F02B 37/18
60/602
6,595,183 B1 7/2003 Olofsson
(Continued)

FOREIGN PATENT DOCUMENTS

DE 102016111686 A1 1/2017
JP H11210449 A 8/1999
(Continued)

OTHER PUBLICATIONS

An English Machine Translation the reference to Yamagata Naoyuki et al. (Pub. Number JP-11-210449 A), published on Aug. 3, 1999. (Year: 1999).*
(Continued)

*Primary Examiner* — Thai Ba Trieu
(74) *Attorney, Agent, or Firm* — Geoffrey Brumbaugh; McCoy Russell LLP

(57) ABSTRACT

Methods and systems are provided for a close-coupled aftertreatment device. In one arrangement, a system may include an engine comprising separate first and second overall exhaust lines, where a blow-off line branches off of the second overall exhaust line, and where the close-coupled aftertreatment device is arranged in the blow-off line and configured to receive exhaust gases during at least a cold-start of the engine.

20 Claims, 6 Drawing Sheets

(51) Int. Cl.
*F01N 3/08* (2006.01)
*F01N 3/10* (2006.01)
*F01N 3/30* (2006.01)
*F01N 13/10* (2010.01)
*F02B 37/18* (2006.01)
*F02B 75/20* (2006.01)
*F01N 13/00* (2010.01)
*F02B 75/18* (2006.01)

(52) U.S. Cl.
CPC .......... *F01N 3/30* (2013.01); *F01N 13/0093* (2014.06); *F01N 13/10* (2013.01); *F01N 13/107* (2013.01); *F02B 37/18* (2013.01); *F02B 75/20* (2013.01); *F02M 26/22* (2016.02); *F01N 2240/36* (2013.01); *F01N 2340/06* (2013.01); *F01N 2410/06* (2013.01); *F01N 2430/10* (2013.01); *F01N 2900/1602* (2013.01); *F02B 2075/1812* (2013.01)

(58) Field of Classification Search
CPC .... F01N 13/0093; F01N 13/10; F01N 13/107; F01N 2240/36; F01N 2340/06; F01N 2340/10; F01N 2075/1812; F01N 2900/1602; F02B 37/18; F02B 72/20; F02B 2075/1812; F02D 23/00
USPC .................. 60/605.2, 280, 286; 701/108
See application file for complete search history.

(56) References Cited

U.S. PATENT DOCUMENTS

| | | | | |
|---|---|---|---|---|
| 6,742,506 | B1* | 6/2004 | Grandin | F02B 37/00 123/568.12 |
| 6,883,319 | B2* | 4/2005 | Ekenberg | F02B 37/18 60/602 |
| 8,069,663 | B2* | 12/2011 | Ulrey | F02B 37/18 60/605.2 |
| 8,495,992 | B2 | 7/2013 | Roth | |
| 8,601,811 | B2* | 12/2013 | Pursifull | F02M 26/05 60/605.2 |
| 8,833,075 | B2 | 9/2014 | Pursifull et al. | |
| 9,080,523 | B1 | 7/2015 | Ulrey et al. | |
| 9,470,182 | B2* | 10/2016 | Ulrey | F02M 26/05 |
| 10,012,159 | B1* | 7/2018 | Ulrey | F01N 13/107 |
| 10,018,123 | B1* | 7/2018 | Ulrey | F02M 26/14 |
| 2002/0185105 | A1* | 12/2002 | Martin | F01L 1/26 123/308 |
| 2007/0119168 | A1* | 5/2007 | Turner | F02B 37/18 60/602 |
| 2009/0223220 | A1* | 9/2009 | Vuk | F01N 13/107 60/605.2 |
| 2011/0000470 | A1 | 1/2011 | Roth | |
| 2011/0126519 | A1* | 6/2011 | Okada | F02D 13/0246 60/285 |
| 2011/0219767 | A1* | 9/2011 | Miyashita | F02B 37/18 60/600 |
| 2012/0023935 | A1 | 2/2012 | Pursifull et al. | |
| 2015/0316005 | A1* | 11/2015 | Madison | F01N 13/107 60/605.2 |
| 2016/0010539 | A1* | 1/2016 | Verdoorn | F02B 37/183 60/600 |
| 2016/0017783 | A1* | 1/2016 | Keating | F01N 13/107 60/605.2 |
| 2016/0131021 | A1* | 5/2016 | Baker | F02D 23/00 60/605.1 |
| 2016/0160772 | A1* | 6/2016 | Keating | F02M 26/49 701/108 |
| 2017/0218826 | A1* | 8/2017 | Uhrich | F02M 26/15 |
| 2018/0170353 | A1* | 6/2018 | Ulrey | F01N 13/107 |
| 2018/0171867 | A1* | 6/2018 | Ulrey | F01N 13/107 |
| 2018/0171868 | A1* | 6/2018 | Leone | F01N 13/107 |
| 2018/0171883 | A1* | 6/2018 | Ulrey | F01N 13/107 |
| 2018/0171886 | A1* | 6/2018 | Ulrey | F01N 13/107 |
| 2018/0171887 | A1* | 6/2018 | Ulrey | F01N 13/107 |
| 2018/0171897 | A1* | 6/2018 | Boyer | F01N 13/107 |
| 2018/0171899 | A1* | 6/2018 | Ulrey | F01N 13/107 |
| 2018/0171904 | A1* | 6/2018 | Ulrey | F01N 13/107 |
| 2018/0171906 | A1* | 6/2018 | Ulrey | F02B 37/18 |
| 2018/0171907 | A1* | 6/2018 | Ulrey | F01N 13/107 |
| 2018/0171908 | A1* | 6/2018 | Ulrey | F02B 37/18 |
| 2018/0171911 | A1* | 6/2018 | Ulrey | F01N 13/107 |
| 2018/0171914 | A1* | 6/2018 | Ulrey | F01N 3/10 |
| 2018/0171917 | A1* | 6/2018 | Ulrey | F01N 13/107 |
| 2019/0032579 | A1* | 1/2019 | Ulrey | F01N 13/107 |
| 2019/0063351 | A1* | 2/2019 | Zeng | F02M 26/04 |
| 2019/0093579 | A1* | 3/2019 | Ulrey | F01N 13/107 |

FOREIGN PATENT DOCUMENTS

| | | | | |
|---|---|---|---|---|
| JP | 2010255603 A | * | 11/2010 | ............. F02B 37/18 |
| WO | 2013190198 A1 | | 12/2013 | |

OTHER PUBLICATIONS

Larsson, J. et al., "The potential of increased efficiency and power for a tubocharged PFI-SI engine through variable valve actuation and DEP," Thesis for the degree of Master of Science in Engineering, Lund University, Jun. 10, 2015, Lund, Sweden, 73 pages.

* cited by examiner

METHODS AND SYSTEMS FOR A BLOW-OFF LINE

CROSS REFERENCE TO RELATED APPLICATION

The present application claims priority to German Patent Application No. 102017209741.8, filed Jun. 9, 2017. The entire contents of the above-referenced application are hereby incorporated by reference in their entirety for all purposes.

FIELD

The present disclosure relates to adjusting exhaust valve operation of first and second exhaust valves of cylinders of an engine, wherein the adjusting is in response to a cold-start.

BACKGROUND/SUMMARY

An internal combustion engine of the stated type is used as a motor vehicle drive unit. Within the context of the present disclosure, the expression "internal combustion engine" may encompass Otto-cycle engines and also hybrid internal combustion engines, which utilize a hybrid combustion process with applied ignition, and hybrid drives which comprise not only an applied-ignition internal combustion engine but also an electric machine which can be connected in terms of drive to the internal combustion engine and which receives power from the internal combustion engine or which, as a switchable auxiliary drive, additionally outputs power.

Internal combustion engines may comprise a cylinder block and at least one cylinder head which are connected to one another to form the cylinders and the combustion chambers thereof. The cylinder block, as the upper crankcase half, generally serves for the mounting of the crankshaft and for accommodating the piston and the cylinder sleeve of each cylinder.

The crankshaft which is mounted in the crankcase absorbs the connecting rod forces and transforms the oscillating stroke movement of the pistons into a rotational movement of the crankshaft. The upper crankcase half formed by the cylinder block is generally supplemented by the oil pan, which can be mounted on the cylinder block and which serves as the lower crankcase half.

The cylinder head may accommodate the valve drives used for the charge exchange. During the course of the charge exchange, the discharge of the combustion gases via the exhaust-gas discharge system takes place via the outlet openings, and the feed of the charge air via the intake system takes place via the inlet openings of the at least two cylinders.

Each lifting valve moves, so as to realize, that is to say perform, a maximum valve lift, between an open position and a closed position, and in so doing opens up the valve-specific opening for a certain opening duration during the opening process. The valve actuating mechanism desired for the movement of a valve, including the valve itself, is referred to as the valve drive.

The valve drive may open and close and/or shut-off the inlet opening and outlet opening at the correct times, with a fast opening of the largest possible flow cross sections to maintain the throttling losses in the inflowing and outflowing gases low in order to ensure improved charging of the cylinders and an effective discharge of the exhaust gases. Accordingly, the cylinders may be provided with two or more inlet and outlet openings.

The at least two cylinders of the internal combustion engine to which the present disclosure relates are equipped with at least one inlet opening and at least two outlet openings.

According to the previous examples, the intake lines which lead to the inlet openings, and the exhaust lines which adjoin the outlet openings, are at least partially integrated in the cylinder head. The exhaust lines of the cylinders may be merged to form one common overall exhaust line, or else, as in the internal combustion engine according to the disclosure, in groups to form two overall exhaust lines. The merging of exhaust lines to form an overall exhaust line is referred to as an exhaust manifold, wherein, within the context of the present disclosure, the overall exhaust line is regarded as belonging to the exhaust manifold.

Downstream of the manifolds, the exhaust gases may be supplied, for the purposes of supercharging, to the turbine of at least one exhaust-gas turbocharger, and/or to one or more exhaust-gas aftertreatment systems. In some cases, exhaust gas is recirculated into the intake system.

In the case of the internal combustion engine to which the present disclosure relates, exhaust gas originating from the cylinders is supplied, for supercharging purposes, via a first overall exhaust line to the turbine of at least one exhaust-gas turbocharger, and is subjected to exhaust-gas aftertreatment downstream of the turbine. A second overall exhaust line may connect the cylinders at the outlet side to the intake system upstream of the compressor of the at least one exhaust-gas turbocharger. Here, the exhaust lines of the cylinders are configured so as to form two groups, each group comprising at least one exhaust line from each cylinder, and the exhaust lines of each group merging, in each case with the formation of an exhaust manifold, to form an overall exhaust line.

Internal combustion engines of this type, and methods for operating such internal combustion engines, are described for example in the German laid-open specification DE 10 2016 111 686 A1. In one variant of DE 10 2016 111 686 A1, it is for example possible for the exhaust gas of a first group to be introduced into the intake system downstream or upstream of a compressor of an exhaust-gas turbocharger and/or fed to a turbine of the exhaust-gas turbocharger, whereas the exhaust gas of a second group can be introduced upstream of the compressor and/or fed to the turbine. It is sought to achieve improved knocking control and improved scavenging or purging of the cylinders with fresh air, while at the same time, when desired, maintaining a stoichiometric air ratio during the exhaust-gas aftertreatment. The latter may relate to exhaust-gas aftertreatment (e.g., three-way catalytic converters). An acceleration of the exhaust-gas turbocharger can likewise be realized via an increase of the gas throughput through the cylinders.

The advantage of an exhaust-gas turbocharger in relation to a supercharger, which is driven via an auxiliary drive, consists in that an exhaust-gas turbocharger utilizes the exhaust-gas energy of the hot exhaust gases, whereas a supercharger draws the energy needed for driving it directly or indirectly from the internal combustion engine and thus adversely affects, that is to say reduces, the efficiency, at least for as long as the drive energy does not originate from an energy recovery source. If the supercharger is not one that can be driven via an electric machine, that is to say electrically, a mechanical or kinematic connection for power transmission may be arranged between the supercharger and the internal combustion engine, which also adversely affects or determines the packaging in the engine bay.

An exhaust-gas turbocharger comprises a compressor and a turbine which are arranged on the same shaft. The hot exhaust-gas flow may be fed to the turbine and expands in the turbine with a release of energy, as a result of which the shaft is set in rotation. The energy released by the exhaust-gas flow to the turbine and ultimately to the shaft is used for driving the compressor which is likewise arranged on the shaft. The compressor delivers and compresses the charge air supplied to it, as a result of which supercharging of the at least two cylinders is obtained. A charge-air cooling arrangement may be provided to cool the compressed charge air before it enters the cylinders.

Supercharging may increase the power of the internal combustion engine. Here, the air used for the combustion process is compressed, as a result of which a greater air mass can be supplied to each cylinder per working cycle. In this way, the fuel mass and therefore the mean pressure can be increased. Supercharging may increase the power of an internal combustion engine while maintaining an unchanged swept volume, or for reducing the swept volume while maintaining the same power. In all cases, supercharging leads to an increase in volumetric power output and a more expedient power-to-weight ratio. If the swept volume is reduced, it is possible, given the same vehicle boundary conditions, to shift the load collective toward higher loads, at which the specific fuel consumption is lower.

Supercharging consequently assists in the efforts to minimize fuel consumption of an internal combustion engine, that is to say to improve the efficiency of the internal combustion engine.

A suitable transmission configuration may provide downspeeding, whereby a lower specific fuel consumption is likewise achieved. In the case of downspeeding, use is made of the fact that the specific fuel consumption at low engine speeds is generally lower, in particular in the presence of relatively high loads.

With targeted configuration of the supercharging, it is also possible to obtain advantages with regard to the exhaust-gas emissions. With suitable supercharging for example of a diesel engine, the nitrogen oxide emissions can therefore be reduced without any losses in efficiency. At the same time, the hydrocarbon emissions can be positively influenced. The emissions of carbon dioxide, which correlate directly with fuel consumption, decrease in any case with falling fuel consumption.

To be able to adhere to limit values for pollutant emissions in future, further measures in addition to supercharging are necessary, for which reason use is generally made of various exhaust-gas aftertreatment systems for converting the pollutants.

The internal combustion engine to which the present disclosure relates is equipped not only with the supercharging arrangement but also with an exhaust-gas aftertreatment arrangement.

It may be desired to arrange the turbine of an exhaust-gas turbocharger as close as possible to the outlet openings of the cylinders to increasingly utilize the exhaust-gas enthalpy of the hot exhaust gases, which is determined significantly by the exhaust-gas pressure and the exhaust-gas temperature, and to allow a fast response behavior of the turbine and thus of the turbocharger. Furthermore, the close-coupling may minimize the thermal inertia and the volume of the line system between the outlet openings of the cylinders and of the turbine, which may be achieved by reducing the mass and the length of the exhaust lines. Here, the integration of the exhaust manifolds into the cylinder head is expedient in achieving this aim.

The various exhaust-gas aftertreatment systems may desire certain minimum temperatures in order to be able to convert the respective pollutants, for which reason exhaust-gas aftertreatment systems should also be positioned in as close-coupled a position as possible. With regard to the arrangement of a turbine and of an exhaust-gas aftertreatment system, there is thus a conflict of aims, wherein the turbine may be given the higher priority, as is the case in the internal combustion engine of the present disclosure.

The conversion of the pollutants during the course of the exhaust-gas aftertreatment may be less than a threshold during a cold-start, owing to the relatively great distances that the exhaust gases covers from the exhaust valve outlet openings to the exhaust-gas aftertreatment systems, wherein the turbine functions, and is to be regarded, as an additional temperature sink.

The inventors recognize the above described issues and have come up with a way to at least partially solve them. In one example, a supercharged internal combustion engine having three cylinders in an in-line arrangement, in which internal combustion engine each cylinder has at least one inlet opening for the feed of charge air via an intake system and at least two outlet openings for the discharge of exhaust gas via an exhaust-gas discharge system, each outlet opening being adjoined by an exhaust line, at least one exhaust-gas turbocharger is provided which comprises a turbine arranged in the exhaust-gas discharge system and a compressor arranged in the intake system, the exhaust lines are configured so as to form two groups, each group comprising at least one exhaust line from each cylinder, and the exhaust lines of each group merging, in each case with the formation of an exhaust manifold, to form an overall exhaust line, the first overall exhaust line of a first group opens into the turbine of the at least one exhaust-gas turbocharger, the second overall exhaust line of a second group opens into the intake system upstream of the compressor of the at least one exhaust-gas turbocharger, and at least one exhaust-gas aftertreatment system is provided in the exhaust-gas discharge system downstream of the turbine of the at least one exhaust-gas turbocharger, and which internal combustion engine is distinguished by the fact that a discharge of exhaust gas via the first overall exhaust line can be prevented, and a blow-off line is provided in which a shut-off element is arranged and which branches off, with the formation of a first junction, from the exhaust manifold of the second group and which opens, with the formation of a second junction, into the exhaust-gas discharge system downstream of the turbine of the at least one exhaust-gas turbocharger, an accumulator for unburned hydrocarbons being provided in the blow-off line.

In the case of the internal combustion engine according to the disclosure, exhaust gas originating from the exhaust manifold of the second group can be conducted, via the blow-off line, past the turbine of the exhaust-gas turbocharger. An accumulator for unburned hydrocarbons is provided in the blow-off line.

In one example, during the warm-up phase, in particular during a cold start, for the exhaust gas to be treated in a close-coupled position and in accordance with demand, wherein unburned hydrocarbons situated in the exhaust gas are collected and stored in the accumulator provided according to the disclosure.

For this purpose, the discharge of exhaust gas via the first overall exhaust line is prevented, that is to say suppressed via a shut-off element in the exhaust-gas discharge system upstream or downstream of the turbine. Alternatively, the discharge of exhaust gas via the first overall exhaust line can be prevented by equipping the outlet openings of the first group with switchable valves, and deactivating the valves. The introduction of exhaust gas into the intake system may be stopped, for example by closing a shut-off element provided in the second overall exhaust line.

By opening the shut-off element provided in the blow-off line, the blow-off line is opened up for the exhaust gas originating from the second exhaust manifold, and the accumulator for unburned hydrocarbons is charged with exhaust gas.

The unburned hydrocarbons collected in the accumulator can then be released again, and oxidized, under other operating conditions. The unburned hydrocarbons collected in the accumulator are preferably introduced into the exhaust-gas discharge system with the exhaust gas flowing through the blow-off line, and oxidized using a catalytic converter in the exhaust-gas discharge system.

Since no exhaust gas is discharged from the cylinders via the first overall exhaust line during the warm-up phase, the outlet valves belonging to the outlet openings of the second group may be actuated with regard to an effective charge exchange. That is to say, the outlet openings of the second group may be opened such that the maximum valve lift $\Delta h_{max}$ is realized in each case in a compression phase of the associated cylinder.

When the internal combustion engine has warmed up, when the exhaust gas is discharged from the cylinders predominantly via the first overall exhaust line, the outlet valves of the second group can also, as desired, be opened such that the maximum valve lift $\Delta h_{max}$ is realized in each case upon the transition from the compression phase into an expansion phase of the associated cylinder; in some cases at the charge exchange top dead center.

By doing this, emissions from the internal combustion engine may decrease.

According to the previous examples, the exhaust lines of three-cylinder in-line engines are seldom grouped, because three-cylinder in-line engines may be poorly suited to grouping, in particular cylinder grouping. The merging of the exhaust lines according to the disclosure however avoids these issues.

The internal combustion engine according to an example has exactly three cylinders in an in-line arrangement. The internal combustion engine according to the disclosure is thus a three-cylinder in-line engine.

Embodiments of the supercharged internal combustion engine may further comprise where each cylinder has at least two inlet openings for the supply of charge air via the intake system.

Through the provision of large flow cross sections, the throttling losses in the inflowing charge air can be kept low, and desired charging of the cylinders can be maintained. It may therefore be desired for the cylinders to be equipped with more than one inlet opening, that is to say with at least two inlet openings.

Based on similar or analogous considerations, embodiments of the supercharged internal combustion engine may further comprise where each cylinder has three outlet openings for discharging exhaust gas via the exhaust-gas discharge system, the exhaust lines from two outlet openings per cylinder jointly forming the exhaust manifold of the first group. This may allow an effective discharge of the exhaust gas during the course of the charge exchange.

During normal operation of the warmed-up internal combustion engine (e.g., outside of a cold-start), the cylinders are evacuated primarily via the outlet openings or the exhaust lines of the first group. That is to say, the predominant exhaust-gas fraction is discharged from the cylinders via the first overall exhaust line via the first group of exhaust valves.

The exhaust lines of two outlet openings per cylinder may jointly form the exhaust manifold of the first group, that is to say open into the first overall exhaust line. Then, specifically, a larger inlet cross section, specifically two outlet openings, is provided for the exhaust-gas path via the first overall exhaust line.

For the reasons stated above, embodiments of the supercharged internal combustion engine are also advantageous in which the outlet openings belonging to the exhaust lines of the first group have a larger diameter than the outlet openings belonging to the exhaust lines of the second group.

This embodiment of the outlet openings assigns the or a larger inlet cross section to the exhaust-gas path via the first overall exhaust line, with a larger diameter of the outlet opening.

Embodiments of the supercharged internal combustion engine may comprise where the blow-off line opens, with the formation of the second junction, into the exhaust-gas discharge system upstream of an exhaust-gas aftertreatment system provided in the exhaust-gas discharge system.

If the blow-off line is opened with exhaust gas flowing therethrough, unburned hydrocarbons collected in the accumulator can be released again. The released unburned hydrocarbons pass together with the exhaust gas into the exhaust-gas discharge system at the second junction, and can in the present case be converted or oxidized in the exhaust-gas aftertreatment system provided downstream of the second junction. This is desired if the exhaust-gas aftertreatment system used is a three-way catalytic converter.

Nevertheless, the blow-off line may also open, with the formation of the second junction, into the exhaust-gas discharge system downstream of an exhaust-gas aftertreatment system provided in the exhaust-gas discharge system or else between two exhaust-gas aftertreatment systems, wherein the two exhaust-gas aftertreatment systems may also be exhaust-gas aftertreatment systems of the same type, for example two three-way catalytic converters.

Embodiments of the supercharged internal combustion engine may comprises where a shut-off element is provided in the exhaust-gas discharge system between the turbine of the at least one exhaust-gas turbocharger and the second junction for preventing the discharge of exhaust gas via the first overall exhaust line.

Embodiments of the supercharged internal combustion engine may further comprise where a shut-off element is provided in the exhaust-gas discharge system upstream of the turbine of the at least one exhaust-gas turbocharger for preventing the discharge of exhaust gas via the first overall exhaust line.

The above embodiments may use a shut-off element for adjusting the discharge of exhaust gas via the first overall exhaust line, wherein the shut-off element can be provided, or is to be provided, in the exhaust-gas discharge system upstream of the turbine or between the turbine and the second junction.

Embodiments of the supercharged internal combustion engine may comprise where the outlet openings belonging to the exhaust lines of the first group are each equipped with an at least partially variably actuatable outlet valve, which outlet valves can be deactivated for the purposes of shutting off the associated outlet opening and prevent the discharge of exhaust gas via the first overall exhaust line.

Embodiments of the supercharged internal combustion engine may comprise where a shut-off element is provided in the second overall exhaust line downstream of the first junction.

The introduction of exhaust gas into the intake system may be stopped by closing a shut-off element provided in the second overall exhaust line, when exhaust gas originating from the cylinders is discharged via the blow-off line and the discharge of exhaust gas via the first overall exhaust line is prevented, that is to say stopped.

The shut-off element provided in the second overall exhaust line may adjust the recirculation rate of an exhaust-gas recirculation arrangement.

Embodiments of the supercharged internal combustion engine may comprise where a cooler is provided in the second overall exhaust line downstream of the first junction.

The second overall exhaust line may be used for the recirculation of combustion gases from the outlet side to the inlet side, that is to say in the context of exhaust-gas recirculation, for the purposes of reducing nitrogen oxide emissions. To obtain a considerable reduction in nitrogen oxide emissions, high exhaust-gas recirculation rates may be desired, which may be of the order of magnitude of $x_{EGR} \approx 60\%$ to 70% or more. Such high recirculation rates may desire cooling of the exhaust gas for recirculation, where the temperature of the exhaust gas is reduced and the density of the exhaust gas increased, so that a greater mass of exhaust gas can be recirculated. Consequently, an exhaust-gas recirculation arrangement may be equipped with a cooler. During the cooling process, condensate can form, which is precipitated in the cooler.

Embodiments of the supercharged internal combustion engine may comprise where a charge-air cooler is provided in the intake system downstream of the compressor of the at least one exhaust-gas turbocharger, where the charge-air cooler may cool the compressed charge air before it enters the at least two cylinders. The cooler lowers the temperature and thereby increases the density of the charge air, such that the cooler also contributes to improved charging of the cylinders, that is to say to a greater air mass. In effect, compression by cooling occurs.

Embodiments of the supercharged internal combustion engine may comprise where at least one three-way catalytic converter is provided, for the purposes of exhaust-gas after-treatment, in the exhaust-gas discharge system downstream of the turbine of the at least one exhaust-gas turbocharger.

To reduce the pollutant emissions, internal combustion engines may be equipped with various exhaust-gas after-treatment systems. Even without additional measures, oxidation of the unburned hydrocarbons (HC) and of carbon monoxide (CO) duly takes place during the expansion and discharge of the cylinder charge at a sufficiently high temperature level and in the presence of sufficiently large oxygen quantities. However, on account of the exhaust-gas temperature which falls quickly in the downstream direction, and the consequently rapidly decreasing rate of reaction, the reactions may be quickly halted.

For these reasons, use is made of catalytic reactors which, through the use of catalytic materials which increase the rate of certain reactions, allow an oxidation of HC and CO even at low temperatures. If nitrogen oxides are additionally to be reduced, this can be achieved by the use of a three-way catalytic converter, which however for this purpose utilizes stoichiometric operation ($\lambda \approx 1$) of the internal combustion engine within narrow limits. Here, the nitrogen oxides are reduced via the non-oxidized exhaust-gas components which are present, specifically the carbon monoxides and the unburned hydrocarbons, wherein the exhaust-gas components may be oxidized at the same time.

In internal combustion engines which are operated with an excess of air, the nitrogen oxides contained in the exhaust gas may not be reduced without introduction of a reducing agent in the exhaust gas. For the oxidation, oxidation catalytic converters are then provided in the exhaust-gas discharge system.

Embodiments of the supercharged internal combustion engine may comprise where the second exhaust valves corresponding to the second overall exhaust line are each equipped with an at least partially variably actuatable outlet valve, the outlet valve oscillating between an open position and a closed position, so as to realize a maximum valve lift $\Delta h_{max}$, and in the process opening up the associated outlet opening for the opening duration $\Delta t_{max}$ during an opening process, and the opening process being capable of being advanced and/or retarded.

During some operations of the warmed-up internal combustion engine outside of a cold-start, when the valves of all of the cylinder openings are active and actuated, the actuation of the second outlet valves may be performed with the aim of recirculating exhaust gas or gas into the intake system upstream of the compressor. Additionally or alternatively, the second outlet valves may be actuated in response to a loading of an accumulator arranged in a blow-off line branching from the second overall exhaust line.

By contrast, during the warm-up phase and/or the cold-start, when no exhaust gas is discharged from the cylinders via the exhaust-gas discharge system via the first overall exhaust line, the outlet valves of the second group are correspondingly actuated, for an effective charge exchange. That is to say, the second exhaust valves may open at a time similar to an opening of the first exhaust valves outside of a cold-start. For this purpose, it may be possible for the opening process of the second exhaust valves to be advanced during the cold-start and/or warm-up phase. That is to say, the outlet openings of the second group are opened earlier, specifically such that the maximum valve lift $\Delta h_{max}$ is realized in each case in the compression phase of the charge exchange of the associated cylinder.

When the warm-up phase and/or cold-start is complete, the opening process of the second exhaust valves may be retarded and the first exhaust valves may be activated. The maximum valve lift $\Delta h_{max}$ is then realized in each case in the expansion phase of the charge exchange of the associated cylinder, or upon the transition from the compression phase into the expansion phase, possibly at the charge exchange top dead center. In other words, the second exhaust valves may open at a transition between an exhaust stroke and an intake stroke of a piston.

Embodiments of the supercharged internal combustion engine may comprise where the turbine of the at least one exhaust-gas turbocharger is in the form of a wastegate turbine, a bypass line branching off from the exhaust-gas discharge system upstream of the turbine and a shut-off element being provided in the bypass line.

Embodiments of the supercharged internal combustion engine may comprise where the turbine of the at least one exhaust-gas turbocharger has a variable turbine geometry, which permits extensive adaptation to the respective operating point by adjusting the turbine geometry or of the effective turbine cross section. Here, guide blades for influencing the flow direction may be arranged upstream of the impeller of the turbine. In contrast to the impeller blades of the rotating impeller, the guide blades do not rotate with the shaft of the turbine, that is to say with the impeller. The guide blades are arranged so as to be stationary but not so as to be completely immovable, rather so as to be rotatable about their axis such that the flow approaching the impeller blades can be influenced. In contrast, if the turbine has a fixed, invariable geometry, the guide blades are not only stationary but are also completely immovable, that is to say rigidly fixed, if a guide device is provided at all.

Embodiments of the supercharged internal combustion engine may comprise where the exhaust lines of the at least two cylinders merge to form the two overall exhaust lines within a cylinder head.

The cylinder head of a supercharged internal combustion engine is basically a component that is subject to high thermal and mechanical loading. In particular, with the integration of the exhaust manifolds, the thermal loading of the internal combustion engine and of the cylinder head is increased yet further, such that increased demands are to be placed on the cooling arrangement. Embodiments of the supercharged internal combustion engine may desired where a liquid-type cooling arrangement is provided.

A method for operating a supercharged internal combustion engine of a type described above, is achieved via a method comprising during the warm-up phase after a start of the internal combustion engine the discharge of exhaust gas via the first overall exhaust line is prevented, and exhaust gas originating from the second exhaust manifold is introduced via the blow-off line into the exhaust-gas discharge system downstream of the turbine of the at least one exhaust-gas turbocharger, unburned hydrocarbons situated in the exhaust gas being collected and stored in the accumulator.

For the operation of a supercharged internal combustion engine in which a shut-off element is provided in the second overall exhaust line downstream of the first junction, method variants may comprise where the shut-off element is held closed during the warm-up phase to decrease exhaust-gas recirculation flow. The shut-off element provided in the second overall exhaust line may however basically also serve, during the warm-up phase, for the setting of the exhaust-gas quantity recirculated into the intake system.

Method variants may further include where once the internal combustion engine has warmed up, the blow-off line is opened up for the purposes of oxidizing the unburned hydrocarbons collected in the accumulator.

In this context, method variants may comprise where the unburned hydrocarbons collected in the accumulator are released and introduced with exhaust gas into the exhaust-gas discharge system, the unburned hydrocarbons being oxidized using a three-way catalytic converter. As described above, by opening the second exhaust valves during the charge-exchange outside of the cold-start, a sufficient amount of air and exhaust gas may flow through the accumulator to the three-way catalytic converter to oxidize the unburned hydrocarbons.

For the operation of a supercharged internal combustion engine in which the outlet openings belonging to the exhaust lines of the second group are each equipped with an at least partially variably actuatable outlet valve, the outlet valve oscillating between an open position and a closed position, so as to realize a maximum valve lift $\Delta h_{max}$, and in the process opening up the associated outlet opening for the opening duration $\Delta t_{max}$ during an opening process, and the opening process being capable of being advanced and/or retarded, method variants may comprise where, during the warm-up phase, the outlet valves belonging to the outlet openings of the second group are opened such that the maximum valve lift $\Delta h_{max}$ is realized in each case in a compression phase of the associated cylinder.

In this context, method variants may comprise when the internal combustion engine has warmed up, the outlet valves belonging to the outlet openings of the second group are opened such that the maximum valve lift $\Delta h_{max}$ is realized in each case upon the transition from the compression phase into an expansion phase of the associated cylinder.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for a supercharged, applied-ignition internal combustion engine having three cylinders in an in-line arrangement, in which internal combustion engine each cylinder has at least one inlet opening for the feed of charge air via an intake system and at least two outlet openings for the discharge of exhaust gas via an exhaust-gas discharge system, each outlet opening being adjoined by an exhaust line, at least one exhaust-gas turbocharger is provided which comprises a turbine arranged in the exhaust-gas discharge system and a compressor arranged in the intake system, the exhaust lines are configured so as to form two groups, each group comprising at least one exhaust line from each cylinder, and the exhaust lines of each group merging, in each case with the formation of an exhaust manifold, to form an overall exhaust line, the first overall exhaust line of a first group opens into the turbine of the at least one exhaust-gas turbocharger, the second overall exhaust line of a second group opens into the intake system upstream of the compressor of the at least one exhaust-gas turbocharger, and at least one exhaust-gas aftertreatment system is provided in the exhaust-gas discharge system downstream of the turbine of the at least one exhaust-gas turbocharger. The disclosure also relates to a method for operating an internal combustion engine of the type, in particular during the warm-up phase after a start of the internal combustion engine.

A first embodiment of an engine may comprise three-cylinder arranged in-line, wherein each of the cylinders comprises four valves, two intake valves and two exhaust valves. The exhaust valves may be fluidly coupled to separate exhaust lines, wherein a first group of first exhaust valves are fluidly coupled to a first overall exhaust line and a second group of second exhaust valves are fluidly coupled to a second exhaust line. In one example, the first overall exhaust line may be a higher-pressure exhaust line comprising a turbine and the second overall exhaust line may be a lower-pressure exhaust line configured to provide low-pressure exhaust-gas to an intake system. A blow-off line may branch from a portion of the second overall exhaust line, wherein the blow-off line may comprise an accumulator enabled to store hydrocarbons below a threshold lower temperature. The blow-off line and the first overall exhaust line may merge downstream of the accumulator to form a third overall exhaust line comprising at least one three-way catalyst. The third overall exhaust line may direct exhaust gases to an ambient atmosphere. The first embodiment is shown in FIG. 1A.

Figure 1A:
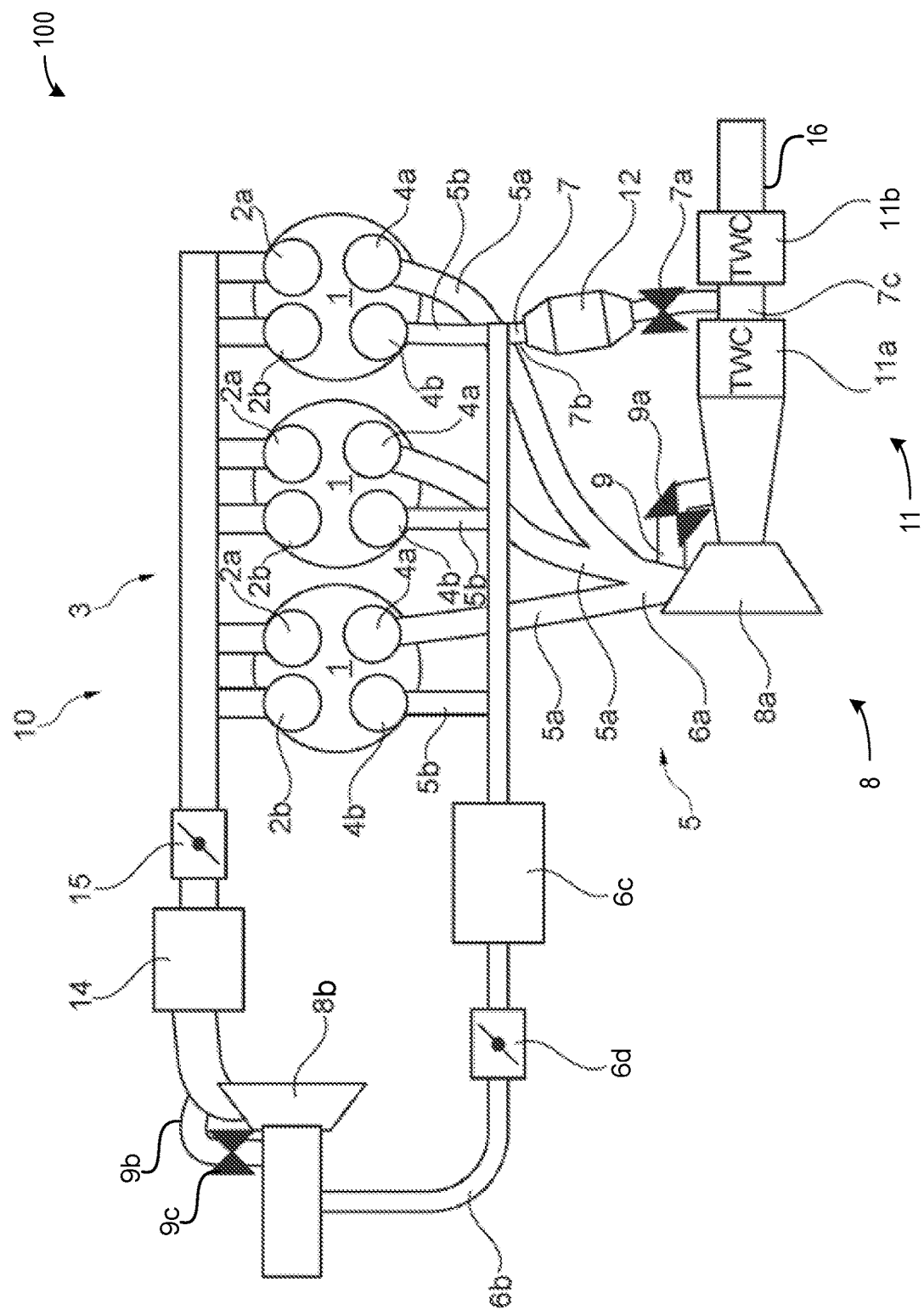
FIG. 1A schematically shows a first embodiment of the supercharged internal combustion engine.
Figure 1B:
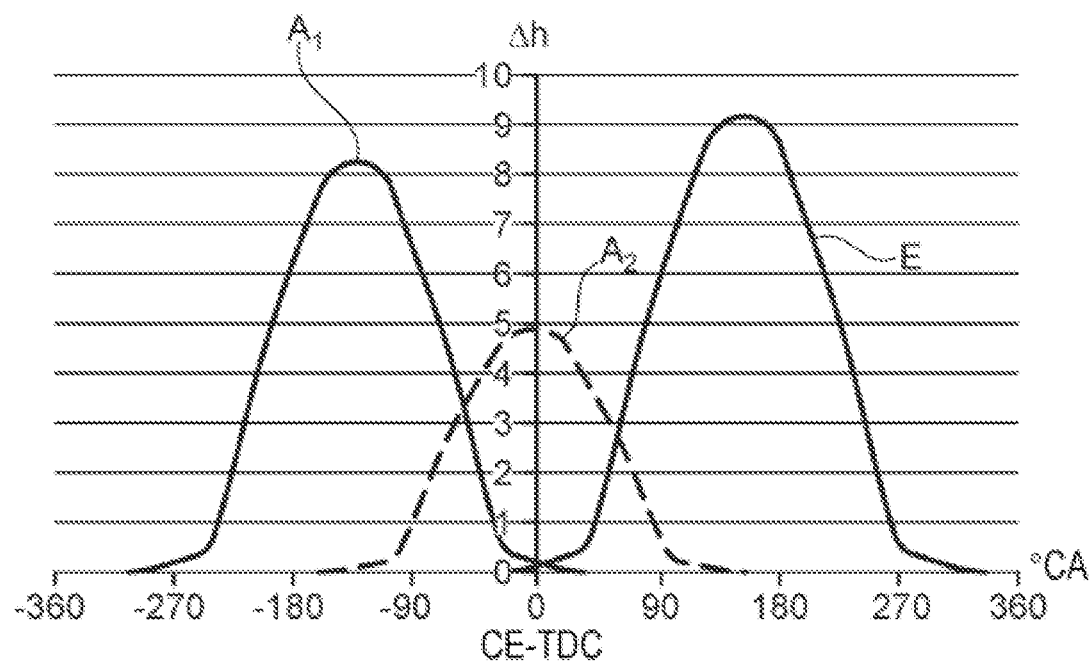
FIG. 1B shows the valve travel curves during an operation of the internal combustion engine of FIG. 1A outside of a cold-start.

Valve timing of the first exhaust valves and the second exhaust valves outside of a cold-start of the first embodiment of the engine is shown in FIG. 1B. Therein, the first exhaust valves may be used to exhaust exhaust gases while the second exhaust valves may be actuated to provide exhaust-gas recirculate and/or to release hydrocarbons trapped on the accumulator. More specifically, releasing hydrocarbons trapped on the accumulator may occur only outside of engine boost conditions. However, exhaust-gas recirculate may flow during and outside of boost conditions.

Figure 1C:
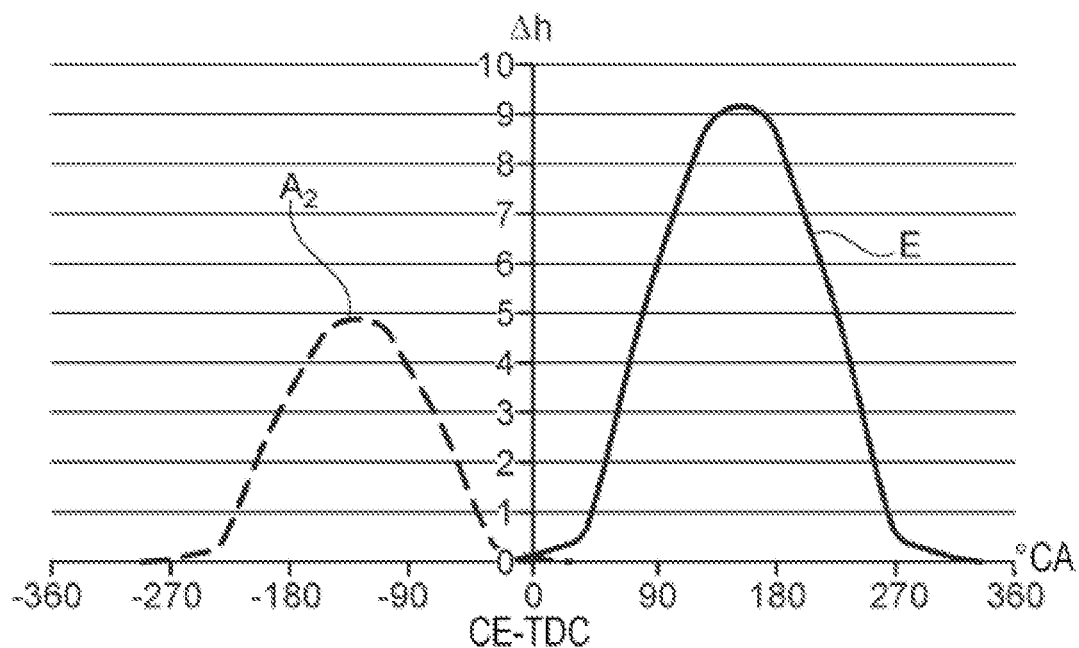
FIG. 1C shows the valve travel curves during a cold-start and/or a warm-up phase of the internal combustion engine of FIG. 1A.

Valve timing of the first exhaust valves and the second exhaust valves during a cold-start of the first embodiment of the engine is shown in FIG. 1C. Therein, an actuator may maintain the first exhaust valves closed and the second exhaust valves may be used to exhaust exhaust gases.

Figure 2A:
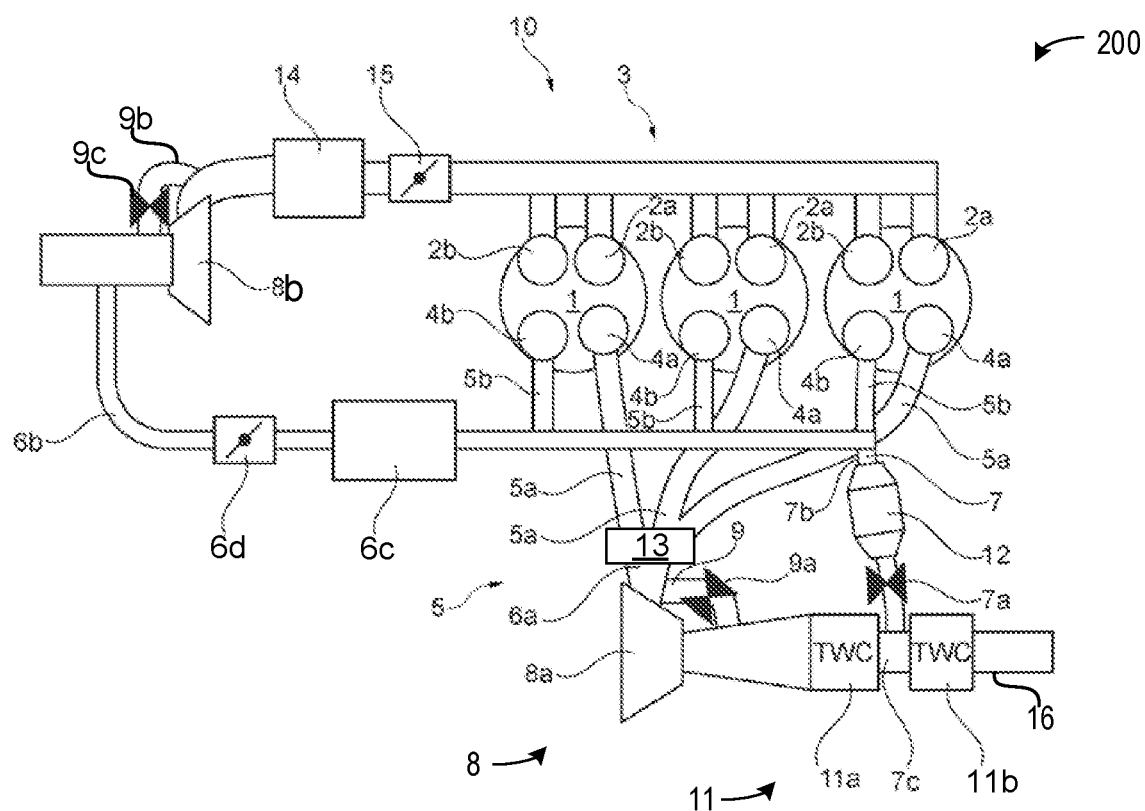
FIG. 2A schematically shows a second embodiment of the supercharged internal combustion engine.
Figure 2B:
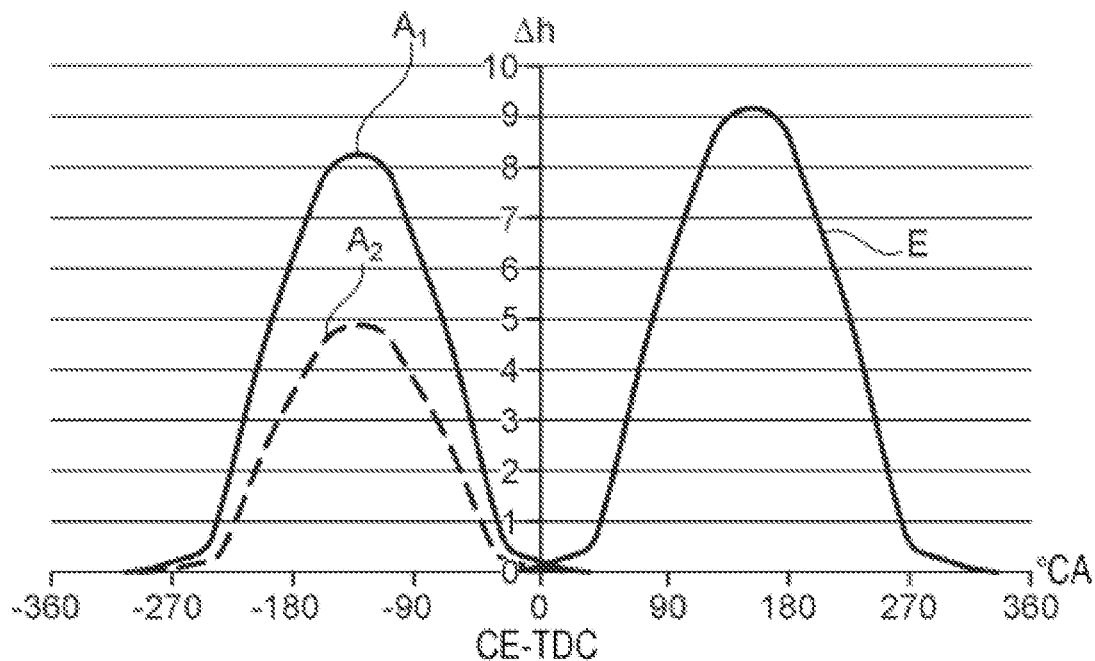
FIG. 2B shows the valve travel curves during the warm-up phase of the internal combustion engine of FIG. 2A.

FIG. 2A shows a second embodiment of the engine shown in FIG. 1A. Therein, the second embodiment may differ from the first embodiment in that the first exhaust valves do not comprise an actuator configured to maintain the first exhaust valves closed. Thus, during a cold-start of the second embodiment of an engine, the first exhaust valves may continue to oscillate between open and closed positions, as shown in FIG. 2B. However, the first overall exhaust line of the second embodiment may comprise a shut-off element (e.g., a valve) shaped to prevent exhaust gas flow from the first overall exhaust line to its turbine and the third overall exhaust line.

Figure 3A:
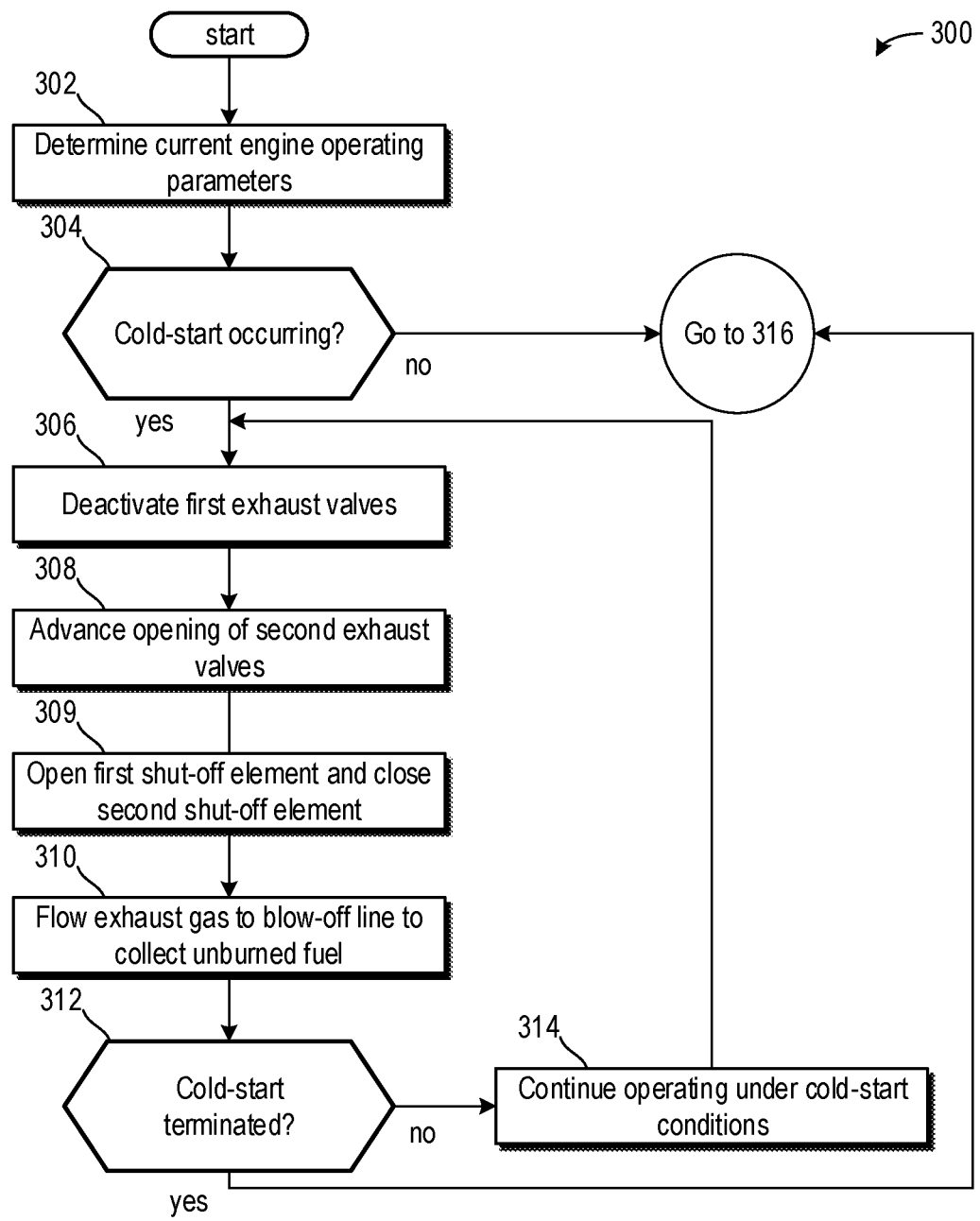
FIGS. 3A and 3B show a method for operating exhaust valves of the engine during and outside of a cold-start.
Figure 3B:
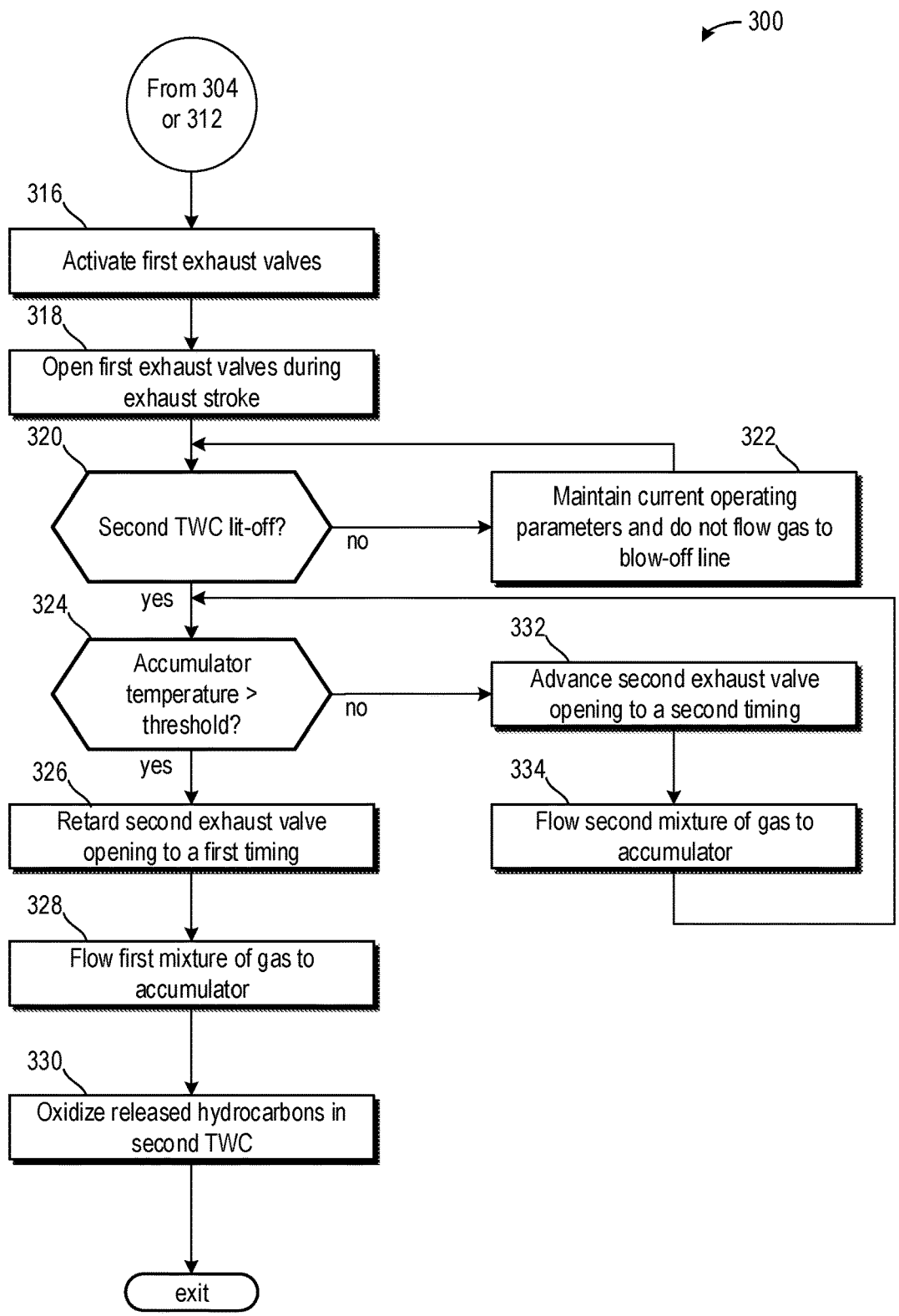
Figure 4:
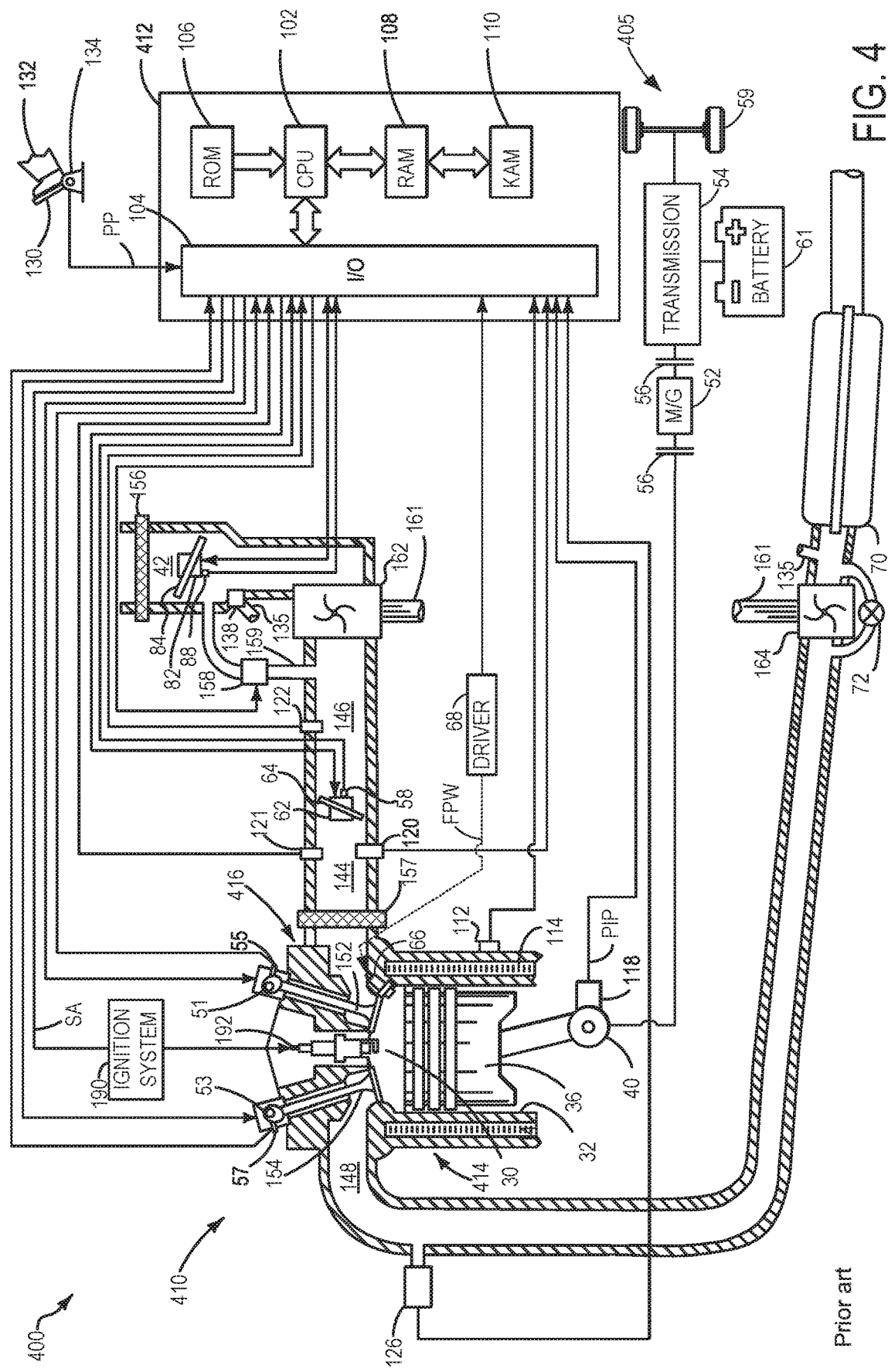
FIG. 4 shows a schematic of a cylinder of an engine of a hybrid vehicle.

FIGS. 3A and 3B illustrate a method for operating the first and second exhaust valves during and outside of a cold-start. FIG. 4 illustrates a schematic of a single cylinder of an engine of a hybrid vehicle.

Turning now to FIG. 1A, it shows a first embodiment 100 of a supercharged internal combustion engine 10 equipped with an exhaust-gas turbocharger 8. The exhaust-gas turbocharger 8 comprises a turbine 8a arranged in an exhaust-gas discharge system 5 and a compressor 8b arranged in an intake system 3. Hot exhaust gas expands in the turbine 8a, releasing energy, whereby the shaft of the exhaust-gas turbocharger 8 is set in rotation. The energy released by the exhaust-gas flow to the turbine 8a and ultimately to the shaft is used for driving the compressor 8b which is likewise arranged on the shaft. The compressor 8b compresses gases flowing therethrough and conducts the compressed charge air via the intake system 3, in which a charge-air cooler 14 and a throttle element 15 are arranged, to the cylinders 1, whereby supercharging of the internal combustion engine 10 is realized.

Each of the turbine 8a and the compressor 8b may be equipped with corresponding bypasses and bypass valves. More specifically, the turbine 8a may comprise a turbine bypass 9 comprising a turbine bypass element 9a. Similarly, the compressor 8b may comprise a compressor bypass 9b comprising a compressor bypass element 9c. If less or no boost is desired, then each of the turbine and compressor bypass elements 9a and 9c may be actuated to open positions to allow gas to flow around the turbine 8a and compressor 8b, respectively.

The internal combustion engine 10 may be a three-cylinder in-line engine 10 in which the three cylinders 1 are arranged along the longitudinal axis of the cylinder head, that is to say in a line. Each cylinder 1 has two inlet openings 2a, 2b for the feed of charge air via the intake system 3, and two outlet openings 4a, 4b which are adjoined by exhaust lines 5a, 5b, respectively, for discharging the exhaust gases via the exhaust-gas discharge system 5. It will be appreciated that the engine 10 may comprise other configurations in a manner known to those of ordinary skill in the art. For example, the engine 10 may be a V6 engine, wherein the three cylinders 1 are cylinders of a first group of cylinders, and where a second group of cylinders of the V6 engine also comprises three cylinders, similar to the cylinder 1.

The exhaust lines 5a, 5b are configured so as to form two groups, each group comprising one exhaust line 5a, 5b from each cylinder 1. The exhaust lines 5a, 5b of each group merge, in each case with the formation of an exhaust manifold, to form overall exhaust lines 6a, 6b, wherein the exhaust lines 5a adjoining the first cylinder-specific outlet openings 4a merge to form a first overall exhaust line 6a, and the exhaust lines 5b adjoining the second cylinder-specific outlet openings 4b merge to form a second overall exhaust line 6b. The first cylinder-specific outlet openings 4a may herein be interchangeably referred to as first exhaust valves 4a and the second cylinder-specific outlet openings 4b may herein be referred to as second exhaust valves 4b.

In other words, the first exhaust valves 4a may fluidly couple the three cylinders 1 to exhaust lines 5a which merge to form a first overall exhaust line 6a. The second exhaust valves 4b may fluidly couple the three cylinders 1 to exhaust lines 5b which merge to form a second overall exhaust line 6b. The first overall exhaust line 6a and the second overall exhaust line 6b may be fluidly separated. In one example, gases in the first overall exhaust line 6a are free from and do not mix with gases in the second overall exhaust line 6b.

The first overall exhaust line 6a may flow gases to the turbine 8a, whereas the second overall exhaust line 6b may flow gases to the intake system 3 upstream of the compressor 8b as low-pressure exhaust gas recirculation. Thus, the first overall exhaust line 6a may be a higher-pressure exhaust line and the second overall exhaust line 6b may be a lower-pressure exhaust line. During some engine conditions where LP-EGR is undesired, the second overall exhaust line 6b may receive higher pressure exhaust gas based on a valve timing of the second exhaust valves 4b.

A blow-off line 7 branches off the second overall exhaust line 6b at a first junction 7b. The blow-off line 7 may further comprise an accumulator 12 upstream of a first shut-off element 7a, which may be a pneumatically, mechanically, electrically, and/or hydraulically actuated valve. The first shut-off element 7a may be shaped to adjust gas flow through the blow-off line 7. More specifically, an actuator of the first shut-off element 7a may actuate the first shut-off element 7a to or between fully closed or fully open positions. The fully closed position may correspond to a lowest amount of gas flow through the first shut-off element (e.g., 0%) and the fully open position may correspond to a highest amount of gas flow through the first shut-off element (e.g., 100%). Thus, actuating the first shut-off element between the fully closed and fully open positions may further meter an amount of gas flowing through the first shut-off element 7a.

The blow-off line 7 may merge with the first overall exhaust line 6a to form a third overall exhaust line 16 at a junction 7c. An exhaust-gas aftertreatment system 11 may be spaced about the junction 7c such that a first three-way catalyst (TWC) 11a is arranged upstream of the junction 7c in the first overall exhaust line 6a and a second TWC 11b is arranged downstream of the junction 7c in the third overall exhaust line 16. The first TWC 11a may be spaced away from the second TWC 11b via a distance equal to a length of the junction 7c. Additionally, the arrangement of the first TWC 11a and the second TWC 11b may allow exhaust gases from the blow-off line 7 to flow to only the second TWC 11b, in one example. Thus, exhaust gases from the blow-off line 7 may not flow to the first TWC 11a, in one example. In this way, the first TWC 11a may receive exhaust gases from only the first overall exhaust line 6a and the second TWC 11b may receive gases from the first overall exhaust line 6a and the blow-off line 7. As will be described below, gases from the blow-off line 7 may have a higher concentration of air and hydrocarbons than gases from the first overall exhaust line 6a.

The arrangement of the accumulator 12 may allow exhaust gas to be captured in a close-coupled position during a cold-start and/or a warm-up phase. In one example, the accumulator 12 is a hydrocarbon (HC) trap configured to store HCs dispersed in exhaust gases. Herein, accumulator 12 may be interchangeably referred to as hydrocarbon trap 12. More specifically, the accumulator may store HCs at a temperature below a light-off temperature of the first and second TWCs 11a and 11b, in some examples. Thus, in some examples, the first shut-off element 7a may be actuated based on a temperature of one or more of the engine 10 and the second TWC 11b, as will be described below with respect to FIGS. 3A and 3B.

In one example where a cold-start is occurring, by moving the first shut-off element 7a to an at least partially open position, the blow-off line 7 is fluidly coupled to the second overall exhaust line 6b and the accumulator 12 receives exhaust gas. In some examples, a second shut-off element 6d, which may be substantially identical to the first shut-off element 7a in one or more of shape and function, may be moved to a more closed or fully closed position to decrease exhaust flow to the intake system 3. Thus, the second shut-off element 6d may be an EGR valve, in one example. The second shut-off element 6d is arranged downstream of the first junction 7b and downstream of a cooler 6c, and may also be used for setting a gas quantity or exhaust-gas quantity for recirculation. Furthermore, when the first shut-off element 7a is at least partially open, the discharge of exhaust gas via the first overall exhaust line 6a may be prevented, that is to say suppressed. In the embodiment 100 of FIG. 1A, the discharge of exhaust gas via the first overall exhaust line 6a is prevented by equipping the first exhaust valves 4a with actuators, such that the first exhaust valves 4a are switchable valves. Each first exhaust valves 4a may be equipped with a lash adjuster or similar switching device configured to maintain the valves closed.

FIG. 1B shows valve travel curves $A_1$, $A_2$ and E during the normal operation of the internal combustion engine 10 where a cold-start is not occurring, whereas FIG. 1C depicts valve travel curves $A_2$ and E during a cold-start and/or A warm-up phase.

Specifically, FIG. 1B shows the valve travel curve $A_1$ of the first outlet valves 4a, the valve travel curve $A_2$ of the second outlet valves 4b, and the valve travel curve E of the inlet valves 2a, 2b of FIG. 1A.

Outside a cold-start of the engine 10, the first exhaust valves 4a may be actuated in accordance with the valve travel curve $A_1$, in a compression phase (e.g., an exhaust stroke) before the charge exchange top dead center, CE-TDC, in order to discharge exhaust gas, and the inlet openings 2a, 2b open, in accordance with the valve travel curve E, in the expansion phase (e.g., intake stroke) after the charge exchange top dead center CE-TDC, in order to supply fresh charge air to the cylinders 1.

The second exhaust valves 4b may be actuated in accordance with the valve travel curve $A_2$, upon the transition from the compression phase (e.g., the exhaust stroke) into the expansion phase (e.g., the intake stroke) of an associated cylinder of the three cylinders 1, wherein the maximum valve lift $\Delta h_{max}$ for the second exhaust valves 4b (e.g., $\Delta h2$) is realized at the charge exchange top dead center CE-TDC. The maximum valve lift $\Delta h_{max}$ of the second exhaust valves may be smaller than a maximum valve lift $\Delta h_{max}$ of the first exhaust valves 4a (e.g., $\Delta h1$) and the intake valves 2a, 2b in order to prevent a collision or contact with the piston. Via the second exhaust valves 4b, exhaust gas from the cylinders 1 flows into the second overall exhaust line 6b with fresh air or charge air, which flows during the course of a purging process from the intake system 3 via inlet openings 2a, 2b into the cylinders 1 and from there directly via second outlet openings 4b into the second overall exhaust line 6b. Based on the valve timing of the second exhaust valves 4b, a composition of exhaust gas in the second overall exhaust line 6b may be different than a composition of exhaust gas in the first overall exhaust line 6a. More specifically, exhaust gas in the second overall exhaust line 6b may comprise a greater amount of air than exhaust gas in the first overall exhaust line.

Exhaust gas in the second overall exhaust line 6b may be utilized as low-pressure exhaust-gas recirculate (LP-EGR) or may be used to release hydrocarbons accumulated in the accumulator 12 of FIG. 1A. Utilization of the exhaust gas may be adjusted based on actuation of the first and second shut-off elements 7a and 6d, respectively. In some examples, the first shut-off element 7a may be actuated to a closed position when boost is desired. The second shut-off element 6d may be actuated to a closed position when EGR is not desired.

Specifically, FIG. 1C shows during the warm-up phase and/or a cold-start, the first outlet valves 4a are deactivated in order to prevent the discharge of exhaust gas via the first overall exhaust line 6a, the valve travel curve $A_1$ is omitted.

Since no exhaust gas is discharged from the cylinders 1 via the first overall exhaust line 6a during the warm-up phase, the second outlet valves 4b reach the maximum valve lift $\Delta h_{max}$ during the compression phase (e.g., the exhaust stroke), and are correspondingly actuated, for the charge exchange. That is to say, the second exhaust valves 4b are in each case opened in the compression phase of the associated cylinder 1.

For this purpose, the second exhaust valves 4b may be equipped with partially variable outlet valves and/or actuators, where the opening process can be advanced or retarded. The second exhaust valves 4b are opened such that the maximum valve lift is realized in each case in the compression phase such that an opening of the second outlet valves 4b and the intake valves 2a, 2b no longer overlap and the second exhaust valves 4b are closed before CE-TDC. As such, the second overall exhaust line 6b and the blow-off line 7 may receive high-pressure exhaust gases during the cold-start.

As such, based on an operation of the second exhaust valves 4b, the second overall exhaust line 6b and the blow-off line 7 may receive higher- or lower-pressure exhaust gases. For example, during the cold-start and/or warm-up phase of the engine 10, the second overall exhaust line 6b and the blow-off line 7 may receive higher-pressure exhaust gases comprising less fresh air due to the advanced opening of the second exhaust valves 4b. Furthermore, the second shut-off element 6d is fully closed to prevent EGR flow. As a further example, outside of the cold-start and/or warm-up phase of the engine 10, the second overall exhaust line 6b may receive lower-pressure exhaust gas, which may be directed to flow to one or more of the intake system 3 as LP-EGR and to the blow-off line 7 to release hydrocarbons from the accumulator 12.

Additionally or alternatively, during some engine conditions where a release of hydrocarbons stored on the accumulator 12 is desired or allowable, the second overall exhaust line 6b may receive lower-pressure exhaust gases and the second exhaust valves 4b valve timing may be retarded, similar to valve travel curve $A_2$ of FIG. 1B. The release of hydrocarbons may occur in response to a temperature of the second TWC (e.g., second TWC 11b of FIG. 1A) being lit-off, where being lit-off includes the catalyst being warmer than a threshold catalyst temperature higher than an initial temperature at which hydrocarbons are stored in the HC trap, the threshold catalyst temperature based on a catalyst temperature where the catalyst may treat emissions in the presence of desired compounds.

Thus, unburned HCs may flow to and be collected in the accumulator 12 under the valve actuation shown in FIG. 1C. The accumulated HCs may be released once the second TWC (e.g., second TWC 11b of FIG. 1A) is lit-off. More specifically, engine operating conditions corresponding to conditions in which the accumulator 12 may release HCs accumulated thereon may include engine operating conditions outside of a cold-start.

FIG. 2A schematically shows a second embodiment 200 of the supercharged internal combustion engine 10. It is sought to explain only the differences in relation to the embodiment illustrated in FIG. 1A, for which reason reference is otherwise made to FIG. 1. As such, components previously introduced may be similarly numbered in this figure and subsequent figures.

By contrast to the first embodiment 100 illustrated in FIG. 1A, it is the case in the internal combustion engine 10 illustrated in FIG. 2A comprises a third shut-off element 13 is provided in the exhaust-gas discharge system 5 upstream of the turbine 8a preventing the discharge of exhaust gas via the first overall exhaust line 6a. Thus, in the second embodiment 200, the second exhaust valves 4a may not comprise an actuator configured to maintain the second exhaust valves 4a closed. Alternatively, the third shut-off element 13 may be actuated to prevent exhaust gas from the first overall exhaust line 6a from flowing to the third overall exhaust line 16. The third shut-off element 13 may be substantially similar to the first and second shut-off elements 7a and 6d in function and/or shape.

FIG. 2B shows the valve travel curves during the warm-up phase of the internal combustion engine illustrated in FIG. 2A.

Since the first exhaust valves 4a are not deactivatable, but rather continue to be actuated, during the warm-up phase, the valve travel curve $A_1$ is not omitted in FIG. 2B.

Since it is however the case, in an unchanged manner, that no exhaust gas discharged via the exhaust-gas discharge system 5 is from the first overall exhaust line 6a during the warm-up phase, the second exhaust valves 4b may continue to be used, and correspondingly actuated, for the charge exchange similar to the $A_2$ shown in FIG. 1C. Thus, exhaust gas may fill a portion of the first overall exhaust line 6a without flowing to the turbine 8a, the turbine bypass 9, and the third overall exhaust line 16 due to a closure of the third shut-off element 13. The second exhaust valves 4b may be opened in the compression phase of the associated cylinder 1, as illustrated in FIG. 2B during the cold-start.

Turning now to FIGS. 3A and 3B, they show a method 300 for operating the exhaust valves of the engine 10 of FIG. 1A. Instructions for carrying out method 300 may be executed by a controller based on instructions stored on a memory of the controller and in conjunction with signals received from sensors of the engine system, such as the sensors described below with reference to FIG. 5. The controller may employ engine actuators of the engine system to adjust engine operation, according to the method described below.

The method 300 begins at 302, which includes determining, estimating, and/or measuring current engine operating parameters. Current engine operating parameters may include, but are not limited to, one or more of throttle position, engine temperature, engine speed, manifold pressure, vehicle speed, exhaust gas recirculation flow rate, and air/fuel ratio.

The method 300 may proceed to 304, which may include determining if a cold-start is occurring. A cold-start may be occurring if an engine temperature is below a threshold temperature and/or below an ambient temperature. The threshold temperature may be based on a desired engine operating range (e.g., 180 to 220° F.). Additionally or alternatively, a cold-start may be occurring if a catalyst (e.g., first or second TWC 11a, 11b) temperature is less than a light-off temperature.

If a cold-start is occurring, then the method 300 may proceed to 306 to deactivate first exhaust valves which may be associated with the first overall exhaust line. The first exhaust valves may be maintained closed via an actuator, for example, a hydraulic lash adjuster, thereby preventing exhaust gas flow from the first exhaust valves to the first overall exhaust line. In this way, exhaust gas may not flow from the cylinders to the turbine.

In some examples, such as the example of embodiment 200 illustrated in FIG. 2A, the first exhaust valves may not be coupled to an actuator configured to maintain a closed position of the first exhaust valves. However, a shut-off element (e.g., third shut-off element 13 of FIG. 2A) arranged in the first overall exhaust line may be actuated to a fully closed position to prevent exhaust gas in the first overall exhaust line from flowing to the turbine. As such, exhaust gas may fill a portion of the first overall exhaust line between the third shut-off element and the cylinders without flowing to the turbine.

The method 300 may proceed to 308, which may include advancing an opening of the second exhaust valves. Advancing the opening of the second exhaust valves during the cold-start may be relative to a timing during engine operating conditions outside of the cold-start. The advancing may be such that overlap between the second exhaust valves being open and the intake valve being open is decreased and/or prevented. More specifically, the advancing may allow the second exhaust valves to open during a compression and/or exhaust stroke of the cylinders, thereby allowing the second exhaust valves to flow higher-pressure exhaust gas with less fresh air to the second overall exhaust line. In one example, the advancing may be similar to the second exhaust valve timing illustrated in FIG. 1C.

The method 300 may proceed to 309, which may include opening a first shut-off element and closing a second shut-off element. The first shut-off element may be arranged in the blow-off line downstream of an accumulator and the second shut-off element may be arranged downstream each of a first junction and a cooler in the second overall exhaust line. As such, the exhaust gas flowing into the second overall exhaust line may not flow to the intake system and may only flow through the blow-off line and into the third overall exhaust line.

The method 300 may proceed to 310, which may include flowing only exhaust gas to the blow-off line to collect unburned fuel. By advancing the opening of the second exhaust valves, overlap between the second exhaust valves and the intake valves being at least partially open may not occur, thereby decreasing an amount of fresh air flowing to the blow-off line. The exhaust gas, which may comprise unburned fuel, may flow to the accumulator (e.g., hydrocarbon trap) arranged in the second exhaust line, where the hydrocarbon trap may capture the unburned fuel. By doing this, emissions during the cold-start may be reduced.

The method 300 may proceed to 312, which may include determining if the cold-start is terminated. The cold-start may be terminated if an engine temperature is greater than the threshold temperature or the ambient temperature. Additionally or alternatively, the cold-start may be terminated if a three-way catalyst is lit-off. If the cold-start is not terminated, then the method 300 may proceed to 314 to continue operating under cold-start conditions until cold-start conditions are no longer met.

However, if the cold-start is terminated or if the cold-start is not occurring as determined at 304, then the method 300 may proceed to 316 of FIG. 3B.

At 316, the method 300 may include activating the first exhaust valves. Activating the first exhaust valves may include allowing the first exhaust valves to move outside of the fully closed position, thereby disabling an actuator associated with the first exhaust valves. Additionally or alternatively, if the first exhaust valves do not comprise an actuator configured to maintain the valves closed, then a shut-off valve is arranged in the first overall exhaust line may be moved to a more open position to allow exhaust gas to flow therethrough.

The method 300 may proceed to 318, which may include opening the first exhaust valves to a maximum opening, Δh1, during an exhaust stroke. High pressure exhaust gas may flow through the first overall exhaust line, through the turbine, and through a remainder of the exhaust line to an ambient atmosphere. Additionally or alternatively, the exhaust gas may bypass the turbine via actuation of a bypass valve and/or wastegate if less boost is desired. In one example, the opening of the first exhaust valves may be similar to a timing illustrated in FIG. 1B.

The method 300 may proceed to 320, which may include determining if a second TWC is lit-off. As described above, the second TWC may be arranged downstream of a second junction where the first overall exhaust line and the blow-off line merge to form the third overall exhaust line. A temperature of the second TWC may be estimated via feedback from a temperature sensor arranged near (e.g., upstream, within, or downstream) the second TWC. If the second TWC is not lit-off, then the method 300 may proceed to 322 to maintain current engine operating parameters and does not flow gases to the blow-off line. The method 300 may continue to monitor a temperature of the second TWC. If the second TWC is lit-off such that it is catalytically active and able to oxidize hydrocarbons, then the method 300 may proceed to 324.

In some examples, a light-off temperature of the second TWC may be greater than a threshold release temperature of the accumulator. As such, coordination between releasing hydrocarbons stored on the accumulator and the second TWC being lit-off may be desired to decrease emissions. In some examples, the cold-start may be complete before the second TWC is lit-off. Exhaust gas may be diverted away from the blow-off line to prevent hydrocarbons being released from the accumulator as the second TWC warms-up.

At 324, the method 300 may include determining if the accumulator temperature is greater than the threshold release temperature. As described above, there may be a period following the conclusion of the cold-start and prior to the second TWC being lit-off where gases do not flow to the accumulator in the blow-off line, allowing the accumulator to cool. As such, a temperature of the accumulator may decrease during the period and may fall well below the threshold release temperature, such that a mixture of exhaust gases and fresh air associated with a first opening timing of the second valve (e.g., timing shown in FIG. 1B) may be too cool to sufficiently heat the accumulator to the threshold release temperature.

If the accumulator temperature is greater than the threshold release temperature, then the method 300 may proceed to 326 to retard an opening of the second exhaust valve. Retarding the opening of the second exhaust valve may include retarding the opening to a first timing, where the second exhaust valve reaches a maximum valve opening height during a charge-exchange. In some examples, the first timing is similar to the timing of the second valve shown via curve $A_2$ in FIG. 1B. Thus, the first timing may include some overlap between an opening of the second exhaust valve and the intake valve.

The method 300 may proceed to 328 which may include flowing a first mixture of gas to the accumulator. The first mixture may include a first composition of exhaust gas and fresh air, where the first composition includes less exhaust gas and more fresh air relative to other mixtures flowing to the accumulator. Additionally or alternatively, a pressure of the first composition may be less than pressures of other mixtures flowing to the accumulator. Hydrocarbons may be released from the accumulator and directed to the second TWC arranged downstream of a second junction where the blow-off line and first overall exhaust line merge.

The method 300 may proceed to 330, which may include oxidizing the released hydrocarbons in the second TWC. The oxidation may be promoted due to the second TWC being lit-off in combination with excess oxygen being present at the second TWC.

Returning to 324, if the accumulator temperature is not greater than the threshold release temperature, then the method 300 may proceed to 332 to advance the second exhaust valve opening. Advancing the second exhaust valve opening may include advancing the second exhaust valve opening to a second timing, which includes the second exhaust valve reaching the maximum valve opening height during the exhaust stroke before the charge exchange. In some examples, the second timing may be substantially similar to the second valve opening shown by plot $A_2$ in FIG. 1C.

The method 300 may proceed to 334 to flow a second mixture of gas to the accumulator. The second mixture may include a second composition of exhaust gas and fresh air, where the second mixture comprises more exhaust gas and less fresh air than other mixtures including the first mixture. By flowing more exhaust gas, a temperature of the accumulator may increase more rapidly.

Additionally or alternatively, flowing the second mixture may include adjusting one or more engine operating parameters to increase a supply of air at the second TWC, wherein the adjusting may include increasing an air/fuel ratio to combustion more lean. By doing this, hydrocarbons incidentally release from the accumulator during its warm-up due to hot spots or the like may still be treated at the second TWC.

In some examples, additionally or alternatively, the second valve timing may be gradually retarded from the second timing to the first timing, such that mixtures of gas between the compositions of the first and second mixtures may flow to the accumulator. In this way, more air and less exhaust gas may begin to flow to the accumulator before the accumulator temperature is greater than the threshold release temperature. This may provide more uniform heating of the accumulator and increase oxidation of hydrocarbons released from the accumulator.

At any rate, the method 300 may continue to monitor the accumulator temperature, similar to 324, following 334.

FIG. 4 depicts an engine system 400 for a vehicle. The vehicle may be an on-road vehicle having drive wheels which contact a road surface. Engine system 400 includes engine 410 which comprises a plurality of cylinders. FIG. 4 describes one such cylinder or combustion chamber in detail. The various components of engine 410 may be controlled by electronic engine controller 412. In one example, engine 410 may be used similarly to internal combustion engine 10 of FIGS. 1A and 2A.

Engine 410 includes a cylinder block 414 including at least one cylinder bore 20, and a cylinder head 416 including intake valves 152 and exhaust valves 154. In other examples, the cylinder head 416 may include one or more intake ports and/or exhaust ports in examples where the engine 410 is configured as a two-stroke engine. The cylinder block 414 includes cylinder walls 32 with piston 36 positioned therein and connected to crankshaft 40. Thus, when coupled together, the cylinder head 416 and cylinder block 414 may form one or more combustion chambers. As such, the combustion chamber 30 volume is adjusted based on an oscillation of the piston 36. Combustion chamber 30 may also be referred to herein as cylinder 30. The combustion chamber 30 is shown communicating with intake manifold 144 and exhaust manifold 148 via respective intake valves 152 and exhaust valves 154. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57. Thus, when the valves 152 and 154 are closed, the combustion chamber 30 and cylinder bore 20 may be fluidly sealed, such that gases may not enter or leave the combustion chamber 30. In one example, intake valves 152 may be used similarly to one or more of intake valves 2a, 2b of FIGS. 1A and 2A. Exhaust valves 154 may be used similarly to first valves 4a or second valves 4b of FIGS. 1A and 2A. More specifically, in the example of FIG. 4, the exhaust valve illustrated may be used similarly to a first valve of the first valve 4a of FIGS. 1A and 2A.

Combustion chamber 30 may be formed by the cylinder walls 32 of cylinder block 414, piston 36, and cylinder head 416. Cylinder block 414 may include the cylinder walls 32, piston 36, crankshaft 40, etc. Cylinder head 416 may include one or more fuel injectors such as fuel injector 66, one or more intake valves 152, and one or more exhaust valves such as exhaust valves 154. The cylinder head 416 may be coupled to the cylinder block 414 via fasteners, such as bolts and/or screws. In particular, when coupled, the cylinder block 414 and cylinder head 416 may be in sealing contact with one another via a gasket, and as such the cylinder block 414 and cylinder head 416 may seal the combustion chamber 30, such that gases may only flow into and/or out of the combustion chamber 30 via intake manifold 144 when intake valves 152 are opened, and/or via exhaust manifold 148 when exhaust valves 154 are opened. In some examples, only one intake valve and one exhaust valve may be included for each combustion chamber 30. However, in other examples, more than one intake valve and/or more than one exhaust valve may be included in each combustion chamber 30 of engine 410. Turbine 164 may be used similarly to turbine 8a of FIGS. 1A and 2A.

In some examples, each cylinder of engine 410 may include a spark plug 192 for initiating combustion. Ignition system 190 can provide an ignition spark to cylinder 30 via spark plug 192 in response to spark advance signal SA from controller 412, under select operating modes. However, in some embodiments, spark plug 192 may be omitted, such as where engine 410 may initiate combustion by auto-ignition or by injection of fuel as may be the case with some diesel engines.

Fuel injector 66 may be positioned to inject fuel directly into combustion chamber 30, which is known to those skilled in the art as direct injection. Fuel injector 66 delivers liquid fuel in proportion to the pulse width of signal FPW from controller 412. Fuel is delivered to fuel injector 66 by a fuel system (not shown) including a fuel tank, fuel pump, and fuel rail. Fuel injector 66 is supplied operating current from driver 68 which responds to controller 412. In some examples, the engine 410 may be a gasoline engine, and the fuel tank may include gasoline, which may be injected by injector 66 into the combustion chamber 30. However, in other examples, the engine 410 may be a diesel engine, and the fuel tank may include diesel fuel, which may be injected by injector 66 into the combustion chamber. Further, in such examples where the engine 410 is configured as a diesel engine, the engine 410 may include a glow plug to initiate combustion in the combustion chamber 30.

Intake manifold 144 is shown communicating with throttle 62 which adjusts a position of throttle plate 64 to control airflow to engine cylinder 30. This may include controlling airflow of boosted air from intake boost chamber 146. In some embodiments, throttle 62 may be omitted and airflow to the engine may be controlled via a single air intake system throttle (AIS throttle) 82 coupled to air intake passage 42 and located upstream of the intake boost chamber 146. In yet further examples, AIS throttle 82 may be omitted and airflow to the engine may be controlled with the throttle 62.

In some embodiments, engine 410 is configured to provide exhaust gas recirculation, or EGR. When included, EGR may be provided as high-pressure EGR and/or low-pressure EGR. In examples where the engine 410 includes low-pressure EGR, the low-pressure EGR may be provided via EGR passage 135 and EGR valve 138 to the engine air intake system at a position downstream of air intake system (AIS) throttle 82 and upstream of compressor 162 from a location in the exhaust system downstream of turbine 164. EGR may be drawn from the exhaust system to the intake air system when there is a pressure differential to drive the flow. A pressure differential can be created by partially closing AIS throttle 82. Throttle plate 84 controls pressure at the inlet to compressor 162. The AIS may be electrically controlled and its position may be adjusted based on optional position sensor 88.

Ambient air is drawn into combustion chamber 30 via intake passage 42, which includes air filter 156. Thus, air first enters the intake passage 42 through air filter 156. Compressor 162 then draws air from air intake passage 42 to supply boost chamber 146 with compressed air via a compressor outlet tube (not shown in FIG. 1). In some examples, air intake passage 42 may include an air box (not shown) with a filter. In one example, compressor 162 may be a turbocharger, where power to the compressor 162 is drawn from the flow of exhaust gases through turbine 164. Specifically, exhaust gases may spin turbine 164 which is coupled to compressor 162 via shaft 161. A wastegate 72 allows exhaust gases to bypass turbine 164 so that boost pressure can be controlled under varying operating conditions. Wastegate 72 may be closed (or an opening of the wastegate may be decreased) in response to increased boost demand, such as during an operator pedal tip-in. By closing the wastegate, exhaust pressures upstream of the turbine can be increased, raising turbine speed and peak power output. This allows boost pressure to be raised. Additionally, the wastegate can be moved toward the closed position to maintain desired boost pressure when the compressor recirculation valve is partially open. In another example, wastegate 72 may be opened (or an opening of the wastegate may be increased) in response to decreased boost demand, such as during an operator pedal tip-out. By opening the wastegate, exhaust pressures can be reduced, reducing turbine speed and turbine power. This allows boost pressure to be lowered.

However, in alternate embodiments, the compressor 162 may be a supercharger, where power to the compressor 162 is drawn from the crankshaft 40. Thus, the compressor 162 may be coupled to the crankshaft 40 via a mechanical linkage such as a belt. As such, a portion of the rotational energy output by the crankshaft 40, may be transferred to the compressor 162 for powering the compressor 162.

Compressor recirculation valve 158 (CRV) may be provided in a compressor recirculation path 159 around compressor 162 so that air may move from the compressor outlet to the compressor inlet so as to reduce a pressure that may develop across compressor 162. A charge air cooler 157 may be positioned in boost chamber 146, downstream of compressor 162, for cooling the boosted aircharge delivered to the engine intake. However, in other examples as shown in FIG. 1, the charge air cooler 157 may be positioned downstream of the electronic throttle 62 in an intake manifold 144. In some examples, the charge air cooler 157 may be an air to air charge air cooler. However, in other examples, the charge air cooler 157 may be a liquid to air cooler.

In the depicted example, compressor recirculation path 159 is configured to recirculate cooled compressed air from upstream of charge air cooler 157 to the compressor inlet. In alternate examples, compressor recirculation path 159 may be configured to recirculate compressed air from downstream of the compressor and downstream of charge air cooler 157 to the compressor inlet. CRV 158 may be opened and closed via an electric signal from controller 412. CRV 158 may be configured as a three-state valve having a default semi-open position from which it can be moved to a fully-open position or a fully-closed position.

Universal Exhaust Gas Oxygen (UEGO) sensor 126 is shown coupled to exhaust manifold 148 upstream of emission control device 70. Alternatively, a two-state exhaust gas oxygen sensor may be substituted for UEGO sensor 126. Emission control device 70 may include multiple catalyst bricks, in one example. In another example, multiple emission control devices, each with multiple bricks, can be used. While the depicted example shows UEGO sensor 126 upstream of turbine 164, it will be appreciated that in alternate embodiments, UEGO sensor may be positioned in the exhaust manifold downstream of turbine 164 and upstream of emission control device 70. Additionally or alternatively, the emission control device 70 may comprise a diesel oxidation catalyst (DOC) and/or a diesel cold-start catalyst, a particulate filter, a three-way catalyst, a $NO_x$ trap, selective catalytic reduction device, and combinations thereof. In some examples, a sensor may be arranged upstream or downstream of the emission control device 70, wherein the sensor may be configured to diagnose a condition of the emission control device 70.

Controller 412 is shown in FIG. 4 as a microcomputer including: microprocessor unit 102, input/output ports 104, read-only memory 106, random access memory 108, keep alive memory 110, and a conventional data bus. Controller 412 is shown receiving various signals from sensors coupled to engine 410, in addition to those signals previously discussed, including: engine coolant temperature (ECT) from temperature sensor 112 coupled to cooling sleeve 114; a position sensor 134 coupled to an input device 130 for sensing input device pedal position (PP) adjusted by a vehicle operator 132; a knock sensor for determining ignition of end gases (not shown); a measurement of engine manifold pressure (MAP) from pressure sensor 121 coupled to intake manifold 144; a measurement of boost pressure from pressure sensor 122 coupled to boost chamber 146; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 412. In a preferred aspect of the present description, Hall effect sensor 118 produces a predetermined number of equally spaced pulses every revolution of the crankshaft from which engine speed (RPM) can be determined. The input device 130 may comprise an accelerator pedal and/or a brake pedal. As such, output from the position sensor 134 may be used to determine the position of the accelerator pedal and/or brake pedal of the input device 130, and therefore determine a desired engine torque. Thus, a desired engine torque as requested by the vehicle operator 132 may be estimated based on the pedal position of the input device 130.

In some examples, vehicle 405 may be a hybrid vehicle with multiple sources of torque available to one or more vehicle wheels 59. In other examples, vehicle 405 is a conventional vehicle with only an engine, or an electric vehicle with only electric machine(s). In the example shown, vehicle 405 includes engine 410 and an electric machine 52. Electric machine 52 may be a motor or a motor/generator. Crankshaft 40 of engine 410 and electric machine 52 are connected via a transmission 54 to vehicle wheels 59 when one or more clutches 56 are engaged. In the depicted example, a first clutch 56 is provided between crankshaft 40 and electric machine 52, and a second clutch 56 is provided between electric machine 52 and transmission 54. Controller 412 may send a signal to an actuator of each clutch 56 to engage or disengage the clutch, so as to connect or disconnect crankshaft 40 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 61 to provide torque to vehicle wheels 59. Electric machine 52 may also be operated as a generator to provide electrical power to charge battery 61, for example during a braking operation.

The controller 412 receives signals from the various sensors of FIG. 4 and employs the various actuators of FIG. 4 to adjust engine operation based on the received signals and instructions stored on a memory of the controller. For example, adjusting operation of the electric machine 52 may occur based on feedback from ECT sensor 112. As will be described in greater detail below, the engine 410 and electric machine 52 may be adjusted such that their operations may be delayed based on one or more of a powertrain temperature, which may be estimated based on feedback from ECT sensor 112, and a distance between an intended destination and an electric-only operation range.

In this way, an engine exhaust system may be divided into a first overall exhaust line and a second overall exhaust line fluidly coupled to first and second exhaust valves, respectively. The first and second overall exhaust lines may be separated, wherein the first overall exhaust line may comprise a turbine and where the second overall exhaust line may comprise a low-pressure exhaust-gas recirculation valve. A blow-off line may branch from the second overall exhaust line such that an accumulator arranged in the blow-off line may be close-coupled to the engine. The technical effect of arranging the accumulator in a close-coupled position to the engine is to decrease emissions during a cold-start of an engine by flowing exhaust gas to the second overall exhaust line and into the blow-off line without flowing exhaust gas as low-pressure EGR or into the first overall exhaust line. By doing this, the hydrocarbons in the accumulator may be stored and opportunistically released during engine operating conditions where a three-way catalyst may oxidize the hydrocarbons.

An embodiment of a supercharged, applied-ignition internal combustion engine having three cylinders in an in-line arrangement, in which internal combustion engine comprises each cylinder has at least one inlet opening shaped to admit charge air from an intake system and at least two outlet openings shaped to discharge exhaust gas to an exhaust-gas discharge system, each outlet opening being adjoined by separate exhaust lines, at least one exhaust-gas turbocharger comprising a turbine arranged in the exhaust-gas discharge system and a compressor arranged in the intake system, the separate exhaust lines being shaped into first and second groups, and where the first and second groups comprise at least one exhaust line from each cylinder, where the exhaust lines of each group merge, in each case with the formation of two separate exhaust manifolds to form a first overall exhaust line and a second overall exhaust line separate from one another, where the first overall exhaust line of the first group opening into the turbine upstream of an exhaust-gas aftertreatment system, and where the second overall exhaust line of a second group opens into the intake system upstream of the compressor, and a blow-off line branching off the second overall exhaust line forming a first junction, the blow-off line comprising a shut-off element downstream of an accumulator shaped to capture hydrocarbons, the blow-off line merges with the first overall exhaust line at a second junction downstream of the shut-off element to form a third overall exhaust. A first example of the supercharged engine further includes where outlet openings corresponding to the first overall exhaust line comprise a larger diameter than the outlet openings corresponding to the second overall exhaust line. A second example of the supercharged engine, optionally including the first example, further includes where the exhaust-gas aftertreatment system comprises a first aftertreatment device and a second aftertreatment device, and where the second junction is upstream of second aftertreatment device of the exhaust-gas aftertreatment system, the second aftertreatment device being arranged in the third overall exhaust line. A third example of the supercharged engine, optionally including the first and/or second examples, further includes where the first and second aftertreatment devices are three-way catalysts. A fourth example of the supercharged engine, optionally including one or more of the first through third examples, further includes where the shut-off element is a first shut-off element, and where the first overall exhaust line further comprises a second shut-off element arranged upstream of the turbine. A fifth example of the supercharged engine, optionally including one or more of the first through fourth examples, further includes where the outlet openings corresponding to the first overall exhaust line are each equipped with an at least partially variably actuatable outlet valve configured to maintain the outlet openings in a closed position. A sixth example of the supercharged engine, optionally including one or more of the first through fifth examples, further includes where an exhaust gas recirculation valve is arranged in the second overall exhaust line downstream of the first junction. A seventh example of the supercharged engine, optionally including one or more of the first through sixth examples, further includes where a cooler is arranged in the second overall exhaust line downstream of the first junction.

An embodiment of a system comprising a turbocharged engine comprising a plurality of cylinders, wherein each cylinder of the plurality of cylinders comprises a first exhaust valve of a plurality of first exhaust valves and a second exhaust valve of a plurality of second exhaust valves, a first overall exhaust line fluidly coupled to the plurality of first exhaust valves and a second overall exhaust line fluidly coupled to the plurality of second exhaust valves, a blow-off line branching off of the second overall exhaust line at a first junction upstream of a LP-EGR valve arranged in the second overall exhaust line, and where the blow-off line comprises a hydrocarbon trap close-coupled to the engine upstream of a second junction where the blow-off line merges with the first overall exhaust line to form a third overall exhaust line, and where the second junction is downstream of a turbine arranged in the first overall exhaust line, and a controller with computer-readable instructions stored on non-transitory memory thereof that when executed enable the controller to in response to a cold-start being complete, retarding an opening of the plurality of second exhaust valves to flow a first mixture of gas to the hydrocarbon trap and portions of the second overall exhaust line downstream of the first junction toward the LP-EGR valve, and where the plurality of first exhaust valves oscillate between open and closed positions, and in response to a cold-start, advancing an opening of the plurality of second exhaust valves to flow a second mixture of gas to only the hydrocarbon trap, and where the plurality of first exhaust valves are maintained closed for the duration of the cold-start. A first example of the system further includes where the first mixture of gas comprises less exhaust gas and more fresh air than the second mixture of gas. A second example of the system, optionally including the first example, further includes where the first overall exhaust line is fluidly separated from the second overall exhaust line. A third example of the system, optionally including the first and/or second examples, further includes where an aftertreatment system comprising a first three-way catalyst and a second three-way catalyst, and where the first three-way catalyst is arranged upstream of the second junction in the first overall exhaust line, the second three-way catalyst being arranged downstream of the second junction in the third overall exhaust line. A fourth example of the system, optionally including one or more of the first through third examples, further includes where hydrocarbons are released from the hydrocarbon trap where exhaust gas flows thereto in response to one or more of the second three-way catalyst being lit-off and a temperature of the hydrocarbon trap being greater than a threshold release temperature. A fifth example of the system, optionally including one or more of the first through fourth examples, further includes where the plurality of first exhaust valves comprise a maximum opening height, $\Delta h1$, and where the plurality of second exhaust valves comprise a maximum opening height, $\Delta H2$, and where $\Delta h1$ is greater than $\Delta h2$.

An embodiment of an engine method comprising adjusting gas flow to an accumulator arranged in a blow-off line fluidly coupled to each of a first overall exhaust line and a second overall exhaust line, and where the first overall exhaust line is fluidly coupled to a plurality of first exhaust valves and the second overall exhaust line is fluidly coupled to a plurality of second exhaust valves, wherein the first overall exhaust line and the second overall exhaust line are fluidly separated, flowing a first mixture of gas to the accumulator outside of a cold-start by retarding an opening of the plurality of second exhaust valves to enable an overlap between an opening of the plurality of the second exhaust valves and one or more intake valves, and flowing a second mixture of gas to the accumulator during the cold-start by advancing an opening of the plurality of second exhaust valves to decrease the overlap between the opening of the plurality of the second exhaust valves and one or more intake valves. A first example of the method further includes where a height of a maximum opening of the plurality of second exhaust valves is less than a height of a maximum opening of the plurality of first exhaust valves, and where a diameter of each of the plurality of second exhaust valves is less than a diameter of each of the plurality of first exhaust valves. A second example of the method, optionally including the first example, further includes where the first mixture comprises less exhaust gas and more fresh air than the second mixture. A third example of the method, optionally including the first and/or second examples, further includes where the first overall exhaust line comprises a turbine upstream of where the first overall exhaust line and the blow-off line merge, and where the second overall exhaust line comprises an exhaust-gas recirculation valve downstream of where the blow-off line branches from the second overall exhaust line, and where the cold-start further includes flowing the second mixture of gas to only the accumulator and not to the turbine and exhaust-gas recirculation valve. A fourth example of the method, optionally including one or more of the first through third examples, further includes where a three-way catalyst is arranged downstream of a junction at which the blow-off line and the first overall exhaust line merge, and where releasing hydrocarbons stored on the accumulator is in response to a temperature of the three-way catalyst. A fifth example of the method, optionally including one or more of the first through fourth examples, further includes where exhaust gas in the first overall exhaust passage does not mix with exhaust gas in the second overall exhaust passage.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine method, comprising:
adjusting a first exhaust valve and a second exhaust valve via a controller to flow exhaust gas to one or more of a first overall exhaust line, a second overall exhaust line separated from the first overall exhaust line, and a blow-off line; and retarding an opening of the second exhaust valve to adjust an amount of fresh air flowing to an HC accumulator in the blow-off line via the controller in response to an accumulator temperature.

2. The method of claim 1, wherein the first exhaust valve comprises a first diameter and the second exhaust valve comprises a second diameter smaller than the first diameter.

3. The method of claim 2, wherein retarding an opening of the second exhaust valve includes increasing an overlap between the opening of the second exhaust valve and an opening of an intake valve via the controller.

4. The method of claim 1, wherein flowing exhaust gas to the first overall exhaust line includes flowing exhaust gas to a turbine upstream of where the first overall exhaust line and the blow-off line merge, and wherein flowing exhaust gas to the second overall exhaust line comprises flowing exhaust gas to an exhaust-gas recirculation valve downstream of where the blow-off line branches from the second overall exhaust line, and wherein flowing exhaust gas to the blow-off line includes flowing exhaust gas to only a portion of the second overall exhaust line upstream of the exhaust-gas recirculation valve and the blow-off line during a cold-start.

5. The method of claim 1, wherein flowing exhaust gas to one or more of the first overall exhaust line, the second overall exhaust line separated from the first overall exhaust line, and the blow-off line includes flowing exhaust to a three-way catalyst that is arranged downstream of a junction at which the blow-off line and the first overall exhaust line merge.

6. The method of claim 1, wherein flowing exhaust gas to the first overall exhaust line includes flowing exhaust gas in the first overall exhaust line that does not mix with exhaust gas in the second overall exhaust line.

7. An internal combustion engine, comprising:
three cylinders in an in-line arrangement;
    wherein each of the three cylinders further comprises:
        at least one inlet opening to admit charge air from an intake system; and
        at least two outlet openings to discharge exhaust gas to an exhaust-gas discharge system;
    wherein each of the at least two outlet openings is adjoined by separate exhaust lines;
at least one exhaust-gas turbocharger comprising a turbine arranged in the exhaust-gas discharge system and a compressor arranged in the intake system;
separate exhaust lines being formed into first and second groups;
    wherein the first and second groups comprise at least one exhaust line from each cylinder;
    wherein the exhaust lines of each of the first and second groups merge, and form two separate exhaust manifolds being a first overall exhaust line and a second overall exhaust line separate from one another;
    wherein the first overall exhaust line of the first group opens into the turbine upstream of an exhaust-gas aftertreatment system; and
    wherein the second overall exhaust line of the second group opens into the intake system upstream of the compressor; and
a blow-off line branching off the second overall exhaust line forming a first junction;
    wherein the blow-off line further comprises a shut-off element downstream of an accumulator to capture hydrocarbons; and
    wherein the blow-off line merges with the first overall exhaust line at a second junction downstream of the shut-off element to form a third overall exhaust line.

8. The internal combustion engine of claim 7, wherein the outlet openings corresponding to the first overall exhaust line comprise a larger diameter than the outlet openings corresponding to the second overall exhaust line.

9. The internal combustion engine of claim 7, wherein the exhaust-gas aftertreatment system comprises a first aftertreatment device and a second aftertreatment device, and where the second junction is upstream of the second aftertreatment device of the exhaust-gas aftertreatment system, the second aftertreatment device being arranged in the third overall exhaust line.

10. The internal combustion engine of claim 9, wherein the first and second aftertreatment devices are three-way catalysts.

11. The internal combustion engine of claim 7, wherein the shut-off element is a first shut-off element, and where the first overall exhaust line further comprises a second shut-off element arranged upstream of the turbine.

12. The internal combustion engine of claim 7, wherein the outlet openings corresponding to the first overall exhaust line are each equipped with an at least partially variably actuatable outlet valve configured to maintain the outlet openings in a closed position.

13. The internal combustion engine of claim 7, wherein an exhaust gas recirculation valve is arranged in the second overall exhaust line downstream of the first junction.

14. The internal combustion engine of claim 13, wherein a cooler is arranged in the second overall exhaust line downstream of the first junction.

15. A system, comprising:
a turbocharged engine comprising a plurality of cylinders, wherein each cylinder of the plurality of cylinders comprises a first exhaust valve of a plurality of first exhaust valves and a second exhaust valve of a plurality of second exhaust valves;
a first overall exhaust line fluidly coupled to the plurality of first exhaust valves and a second overall exhaust line fluidly coupled to the plurality of second exhaust valves;
a blow-off line branching off of the second overall exhaust line at a first junction upstream of a LP-EGR valve arranged in the second overall exhaust line, and where the blow-off line comprises a hydrocarbon trap close-coupled to the engine upstream of a second junction where the blow-off line merges with the first overall exhaust line to form a third overall exhaust line, and where the second junction is downstream of a turbine arranged in the first overall exhaust line; and
a controller with computer-readable instructions stored on non-transitory memory thereof that when executed enable the controller to:
    in response to a cold-start being complete as determined via the controller, retarding an opening of the plurality of second exhaust valves to flow a first mixture of gas to the hydrocarbon trap and portions of the second overall exhaust line downstream of the first junction toward the LP-EGR valve, and where the plurality of first exhaust valves oscillate between open and closed positions; and
    in response to the cold-start as determined via the controller, advancing an opening of the plurality of second exhaust valves to flow a second mixture of gas to only the hydrocarbon trap, and where the plurality of first exhaust valves are maintained closed for a duration of the cold-start.

16. The system of claim 15, wherein the first mixture of gas comprises less exhaust gas and more fresh air than the second mixture of gas.

17. The system of claim 15, wherein the first overall exhaust line is fluidly separated from the second overall exhaust line.

18. The system of claim 15, further comprising an aftertreatment system comprising a first three-way catalyst and a second three-way catalyst, and where the first three-way catalyst is arranged upstream of the second junction in the first overall exhaust line, the second three-way catalyst being arranged downstream of the second junction in the third overall exhaust line.

19. The system of claim 18, wherein hydrocarbons are released from the hydrocarbon trap during some conditions when exhaust gas flows thereto in response to one or more of the second three-way catalyst being lit-off and a temperature of the hydrocarbon trap being greater than a threshold release temperature as determined via the controller.

20. The system of claim 15, wherein the plurality of first exhaust valves comprise a maximum opening height, $\Delta h1$; and
  wherein the plurality of second exhaust valves comprise a maximum opening height, $\Delta h2$; and
    wherein the maximum opening height of the plurality of first exhaust valves $\Delta h1$ is greater than the maximum opening height of the plurality of second exhaust valves $\Delta h2$.

\* \* \* \* \*